US008736233B2

(12) United States Patent
Muramatsu et al.

(10) Patent No.: US 8,736,233 B2
(45) Date of Patent: May 27, 2014

(54) POWER SOURCE DEVICE

(75) Inventors: Shuichi Muramatsu, Numazu (JP); Ryosuke Tonooka, Numazu (JP); Shinji Komatsu, Numazu (JP); Nozomu Katsumata, Numazu (JP); Masaki Asari, Numazu (JP); Hirofumi Yamaguchi, Numazu (JP)

(73) Assignee: Kokusan Denki Co., Ltd., Shizuoka (JP)

(*) Notice: Subject to any disclaimer, the term of this patent is extended or adjusted under 35 U.S.C. 154(b) by 145 days.

(21) Appl. No.: 13/593,873

(22) Filed: Aug. 24, 2012

(65) Prior Publication Data

US 2013/0051097 A1    Feb. 28, 2013

(30) Foreign Application Priority Data

Aug. 31, 2011    (JP) ................................ 2011-189290

(51) Int. Cl.
*H02P 9/00*    (2006.01)
(52) U.S. Cl.
USPC .......................................................... 322/24
(58) Field of Classification Search
USPC ............ 322/28, 24, 20, 44, 22; 700/286, 287, 700/288
See application file for complete search history.

(56) References Cited

U.S. PATENT DOCUMENTS

| 3,617,853 | A | * | 11/1971 | Kawashima et al. | .......... 320/123 |
| 5,214,371 | A | * | 5/1993 | Naidu | .............. 322/29 |
| 6,049,198 | A | * | 4/2000 | Schenk | ........................ 322/90 |
| 6,351,104 | B1 | * | 2/2002 | Koelle et al. | ................... 322/22 |
| 6,555,992 | B2 | * | 4/2003 | Asao et al. | ........................ 322/28 |
| 6,937,484 | B2 | * | 8/2005 | Nakamura et al. | .............. 363/36 |
| 2011/0273147 | A1 | * | 11/2011 | Hall et al. | ........................ 322/28 |

FOREIGN PATENT DOCUMENTS

| JP | 07-087799 | 3/1995 |
| JP | 2007-060857 | 3/2007 |

* cited by examiner

*Primary Examiner* — Tulsidas C Patel
*Assistant Examiner* — Viet Nguyen
(74) *Attorney, Agent, or Firm* — Cooper Legal Group, LLC

(57) ABSTRACT

A power source device for rectifying the output of an AC generator in which magneto coils are in a star-shaped connection in three phases. The device includes a control rectifier circuit configured from a first control rectifier circuit for performing full-wave rectification on three-phase AC voltages, and a second control rectifier circuit for performing full-wave rectification on AC voltages obtained between neutral and each of two-phase AC output terminals selected from the three-phase AC output terminals of the generator, as well as on AC voltage obtained between the selected two-phase AC output terminals; and a controller controlling the first and second circuits so that the output of the first circuit is supplied to the load when the rotational speed of the generator is equal/less than a set speed, and the output of the second circuit is supplied to the load when the rotational speed exceeds the set speed.

12 Claims, 18 Drawing Sheets a 3000 R/MIN, MIN TEMP.
b 3000 R/MIN, MAX TEMP.
c 5000 R/MIN, MIN TEMP.
d 5000 R/MIN, MAX TEMP.

POWER SOURCE DEVICE

TECHNICAL FIELD OF THE INVENTION

The present invention relates to a power source device for supplying power to a load, an AC generator driven by an engine being a power source.

PRIOR ART OF THE INVENTION

Power source devices that supply power to a load using an AC generator driven by an engine as a power source have been used as power source devices installed in vehicles, outboard motors, and the like which use an engine as a drive source. In cases in which a battery is installed in a vehicle, the battery is connected between output terminals of the power source device, and the output of the power source device is controlled so that the voltage of the ends of the battery is kept equal to or less than a set value. AC generators that output three-phase AC voltage are often used.

A power source device for charging a battery with the output of an AC generator that outputs three-phase AC voltage comprises a control rectifier circuit for rectifying symmetrical AC output taken from three-phase non-neutral point AC output terminals of the AC generator and applying this output to a battery, and a control circuit for controlling a thyristor of the control rectifier circuit. The power source device is configured so as to perform control for keeping the output voltage equal to or less than a set value by controlling the thyristor of the control rectifier circuit in accordance with the output voltage, as disclosed in Japanese Laid-open Patent Application No. 2007-60857, for example.

In an output control device of an AC generator disclosed in Japanese Laid-open Patent Application No. 7-87799, a diode bridge rectifier circuit having a configuration in which four series circuits of two diodes are connected in parallel is provided between a load and an AC generator having three-phase magneto coils in a star-shaped connection. In this output control device, the AC output terminal of one phase from the three-phase AC output terminals of the AC generator is connected to one input terminal of a rectifier circuit, and the AC output terminals of the other two phases of the AC generator are connected through respective switching elements to the other two respective input terminals of the rectifier circuit. A neutral point terminal of the AC generator is connected through a switching element to the remaining input terminal of the rectifier circuit.

In the output control device disclosed in Japanese Laid-open Patent Application No. 7-87799, when the engine is rotating at low speed, the switching element connected to the neutral point is turned off and the two switching elements other than the one connected to the neutral point are turned on, and three-phase output of the AC generator is thereby supplied to the load through the rectifier circuit. When the engine is rotating at moderate speed, the switching element connected to the neutral point remains turned off, one of the two switching elements that were turned on during the low speed is turned off, and two-phase output of the AC generator is thereby supplied to the load through the rectifier circuit. When the engine is rotating at high speed, the switching element connected to the neutral point of the AC generator is turned on, the other two switching elements are turned off, and only one-phase output of the AC generator is supplied to the load through the rectifier circuit.

In the output control device disclosed in Japanese Laid-open Patent Application No. 7-87799, due to the three switching elements being controlled according to the engine speed as described above, the power supplied to the load from the AC generator is kept substantially constant from low-speed rotation to high-speed rotation of the engine.

Recently, because of a recent trend of more electrical components being installed in vehicles and the like, there has been a demand for power source devices to have the capacity to output as much power as possible during both low-speed rotation and high-speed rotation of the engine.

The power source device disclosed in Japanese Laid-open Patent Application No. 2007-60857 has a configuration in which symmetrical three-phase AC output taken from the three-phase non-neutral point AC output terminals of the AC generator is rectified and supplied to the load by the rectifier circuit. In the case of such a configuration, the maximum power that can be supplied to the load from the AC generator, during both low-speed rotation and high-speed rotation of the engine, is established by the output characteristics when the AC generator is made to run as a symmetrical AC generator. Therefore, the maximum power that can be supplied to the battery in all engine speeds is established by the power that can be taken from the three-phase non-neutral point AC output terminals of the AC generator, and there are sometimes instances in which the power that can be supplied to the battery is insufficient during low-speed rotation or high-speed rotation, due to the characteristics of the AC generator.

For example, when an AC generator incapable of adjusting the magnetic field in the manner of a magnetic AC generator is used as the AC generator installed in the engine, the output that can be obtained during high-speed rotation is limited when the winding design is set so as to obtain high output during low-speed rotation. When the winding design is set so that high output can be obtained during high-speed rotation, the power that can be obtained during low-speed rotation is limited. Therefore, when the configuration shown in Japanese Laid-open Patent Application No. 2007-60857 is used in a case of using an AC generator such as a magnetic AC generator, it is difficult to configure a power source device that can supply a large amount of power to the load in both a low-speed rotation range and a high-speed rotation range of the engine.

According to the invention disclosed in Japanese Laid-open Patent Application No. 7-87799, although the power supplied to the load from low-speed rotation of the engine until high-speed rotation can be kept substantially constant, the output of the AC generator is suppressed during high-speed rotation of the engine in the case of this invention, and it is not possible to comply with the demand of increasing the power supplied to the load during high-speed rotation of the engine.

SUMMARY OF THE INVENTION

An object of the present invention is to provide a power source device wherein the capacity to supply power to a load can be improved over that of conventional practice.

The present invention relates to a power source device for supplying power to a load, an AC generator driven by an engine being a power source, wherein three-phase AC output terminals are leading from respective non-neutral point terminals of three-phase magneto coils in a star-shaped connection, and a neutral point terminal is leading from a neutral point.

In the present invention, the electric potential of the neutral point is increased by operating the AC generator in an asymmetrical state as necessary, and the power supplied to the load is increased by supplying power to the load from the neutral point as well.

Therefore, the power source device according to the present invention comprises rotational speed detecting means for detecting the rotational speed of the AC generator from the output of the AC generator; a first control rectifier circuit for performing full-wave rectification on three-phase AC voltages obtained from three-phase AC output terminals of the AC generator; a second control rectifier circuit for performing full-wave rectification on AC voltages obtained between the neutral point terminal and each of two-phase AC output terminals selected from the three-phase AC output terminals of the AC generator, as well as on AC voltage obtained between the selected two-phase AC output terminals; and a controller for controlling the first control rectifier circuit and the second control rectifier circuit so that the output of the first control rectifier circuit is supplied to the load when the rotational speed detected by the rotational speed detecting means is equal to or less than a set speed, and the output of the second control rectifier circuit is supplied to the load when the detected rotational speed exceeds the set speed.

With the configuration described above, in a low-speed range in which the rotational speed of the AC generator is equal to or less than the set speed, because power is supplied from the three-phase magneto coils of the AC generator to the load through the first control rectifier circuit, the winding design of the three-phase magneto coils is set in advance so that sufficient output is generated in the low-speed rotation range, whereby sufficient power can be supplied to the load in the low-speed range.

In a range in which the rotational speed of the AC generator exceeds the set speed, power is supplied to the load from the second control rectifier circuit which performs full-wave rectification on AC voltages obtained between the neutral point terminal and each of two-phase AC output terminals selected from the three-phase AC output terminals of the AC generator, as well as on AC voltage obtained between the selected two-phase AC output terminals. In this state, the AC output terminal of the one unselected phase is cut off from the load; therefore, the total number of turns of the magneto coil supplied with the load current can be reduced to reduce the armature reaction, and decreases in the output of the AC generator caused by the armature reaction in the high-speed rotation range can be suppressed.

In a range in which the rotational speed of the AC generator exceeds the set speed, since the load of the AC generator is asymmetrical, the electric potential of the neutral point can be increased and current can be made to flow to the load from the neutral point as well to increase the power that can be supplied to the load.

Thus, in the present invention, the power that can be supplied to the load in the high-speed rotation range can be increased because the armature reaction of the AC generator is reduced by cutting off the magneto coil of one phase from the load and effecting a non-load state in the range in which the rotational speed of the AC generator exceeds the set speed, decreases in the power generation output caused by the armature reaction are suppressed, the electric potential of the neutral point is increased, and power is supplied to the load through the control rectifier circuit from the neutral point as well.

DETAILED DESCRIPTION OF THE PREFERRED EMBODIMENTS

Embodiments of the present invention are described in detail hereinbelow with reference to the drawings.

Figure 1:
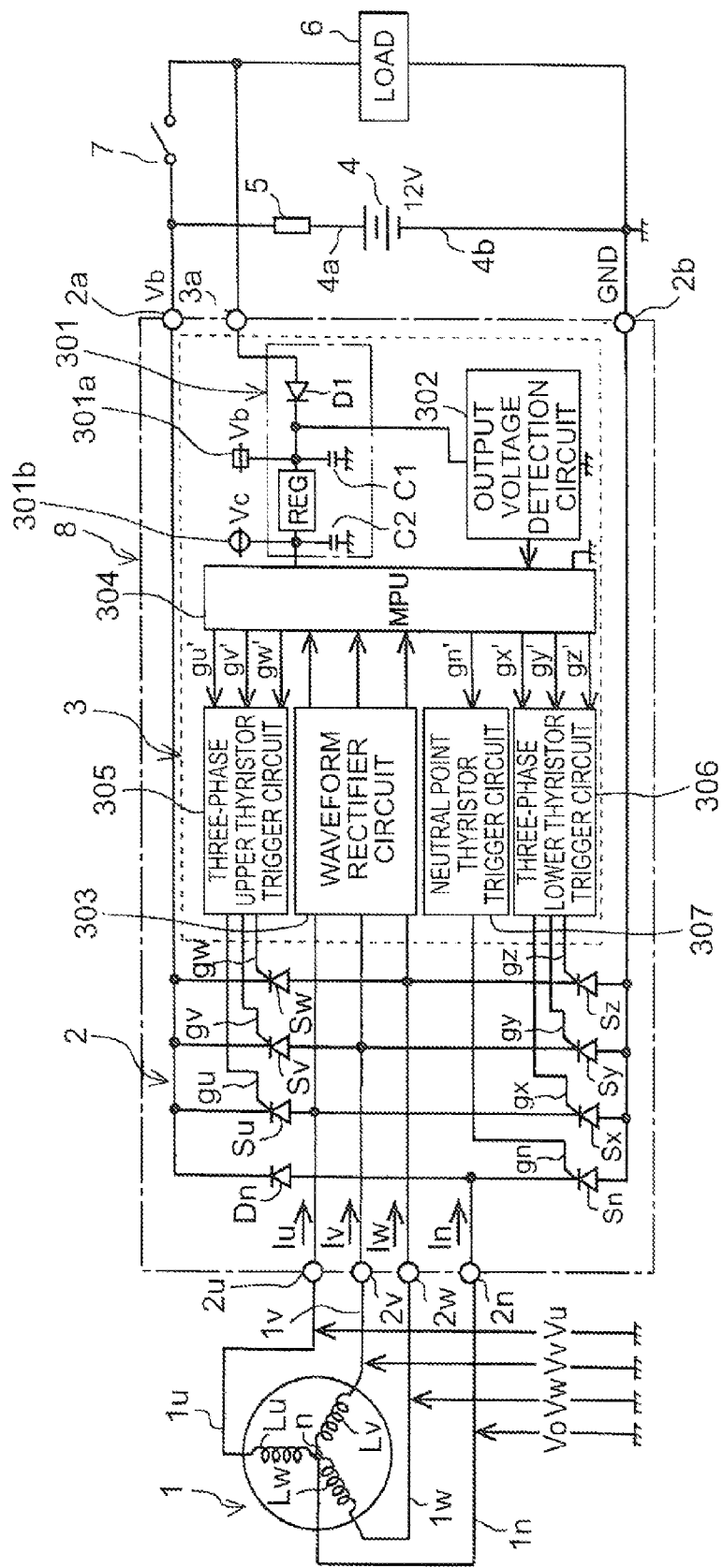
FIG. 1 is a circuit diagram showing the basic configuration of an embodiment of the present invention.

FIG. 1 shows the basic configuration of an embodiment of the present invention. In this drawing, the number 1 indicates an AC generator driven by an engine (not shown), 2 indicates a control rectifier circuit for rectifying the output of the AC generator 1, 3 indicates a control unit for controlling the control rectifier circuit 2, 4 indicates a battery connected between output terminals of the control rectifier circuit 2 via a fuse 5 and charged through the control rectifier circuit 2 by the output of the AC generator 1, and 6 indicates a load to which voltages of both ends of the battery 4 are applied via a switch 7. In this example, a power source device 8 is configured by the control rectifier circuit 2 and the control unit 3, and the battery 4 and the load 6 constitute the load of the power source device 8.

The AC generator 1 used in the present embodiment is composed of a conventional magnetic AC generator comprising: a magnet rotor in which a magnetic field is configured by a permanent magnet, the magnet rotor being attached to a crankshaft of the engine; and a stator in which a coil, which is wound around a slot of an armature core having a magnetic pole part that faces a magnetic pole of the magnet rotor, is in a three-phase star-shaped connection. In FIG. 1, Lu, Lv, and Lw are respectively U-, V-, and W-phase magneto coils in a star-shaped connection, three-phase AC output terminals 1u, 1v, and 1w are leading from the respective non-neutral point terminals of the three-phase magneto coils Lu, Lv, and Lw, and a neutral point terminal 1n is leading from a neutral point n.

The control rectifier circuit 2 comprises three-phase AC input terminals 2u, 2v, and 2w connected respectively to the three-phase AC output terminals 1u through 1w of the AC generator, a neutral point connection terminal 2n connected to the neutral point terminal 1n of the AC generator 1, a cathode-side DC output terminal 2a, and an anode-side DC output terminal 2b. A cathode terminal 4a and anode terminal 4b of the battery 4 are connected respectively to the cathode-side DC output terminal 2a and the anode-side DC output terminal 2b. The control rectifier circuit 2 also comprises three-phase upper thyristors Su, Sv, and Sw whose cathodes are connected to the cathode-side DC output terminal and whose anodes are connected respectively to the three-phase AC input terminals 2u, 2v, and 2w, and three-phase lower thyristors Sx, Sy, and Sz whose anodes share a connection to the anode-side DC output terminal and whose cathodes are respectively connected to the three-phase AC input terminals 2u, 2v, and 2w. The upper section of a bridge circuit is configured by the upper thyristors Su, Sv, and Sw, and the lower section of the bridge circuit is configured by the lower thyristors Sx, Sy, and Sz. The control rectifier circuit 2 also comprises a neutral point diode Dn whose anode is connected to the neutral point connection terminal 2n and whose cathode is connected to the cathode-side DC output terminal 2a, and a neutral point thyristor Sn whose cathode is connected to the neutral point connection terminal 2n and whose anode is connected to the anode-side DC output terminal 2b. In the example illustrated, the anode-side DC output terminal 2b is a ground terminal (GND), and this anode-side DC output terminal is grounded.

The control unit 3 comprises a control power source circuit 301 for generating power source voltage supplied to the components of the control unit, an output voltage detection circuit 302 for detecting voltage at the ends of the battery 4 as output voltage, a waveform rectifier circuit 303 for converting three-phase output voltage waveforms of the AC generator 1 to respective three-phase square wave signals, a microprocessor 304 nm by the supply of power source voltage from the control power source circuit 301, a three-phase upper thyristor trigger circuit 305 for supplying trigger signals gu to gw respectively to the three-phase upper thyristors Su to Sw, a three-phase lower thyristor trigger circuit 306 for supplying trigger signals gx to gz respectively to the three-phase lower thyristors Sx to Sz, and a neutral point thyristor trigger circuit 307 for supplying a trigger signal gn to the neutral point thyristor Sn.

The control power source circuit 301 comprises an input capacitor C1 to which battery voltage Vb is applied through a reverse-current protection diode D1 whose anode is directed toward the cathode of the battery, and a regulator REG for converting the voltage Vb of both ends of the input capacitor C1 to a certain control power source voltage Vc and applying this voltage to both ends of an output capacitor C2. The voltage (output voltage) Vb of both ends of the input capacitor C1 and the voltage Vc of both ends of the output capacitor C2 are outputted respectively from the output terminals 301a and 301b. In the illustrated example, an output voltage input terminal 3a is provided to the control unit 3, and the voltage of both ends of the battery 4 is inputted to the control power source circuit 301 through the switch 7 and the input terminal 3a.

In the present embodiment, providing the reverse-current protection diode D1 to the input part of the control power source circuit 301 prevents the components of the control unit 3 from being damaged when the battery 4 is mistakenly connected in the opposite direction.

The output voltage detection circuit 302, which is on the cathode side of the reverse-current protection diode D1 of the control power source circuit 301, is configured so as to detect the output voltage Vb from voltage obtained by dividing the voltage of both ends of the input capacitor C1 of the control power source circuit, which is equal to the output voltage Vb.

The waveform rectifier circuit 303 is a circuit for rectifying the three-phase AC output voltage waveforms of the AC generator 1 and converting them into square wave signals indicating a duration-high level for half the wave of one polarity of the three-phase AC voltages, and indicating a duration-zero level for half the wave of the other polarity. The three-phase square wave signals obtained by rectifying the waveforms of the three-phase AC voltages are generated in electrical angles, at angular intervals of 120°. This waveform rectifier circuit can be configured, for example, by a circuit that comprises a switch circuit which turns on for the duration of the negative half wave of the three-phase AC voltages and turns off for the duration of the positive half wave, wherein square wave voltages are obtained at both ends of the switch circuit.

Figure 2:
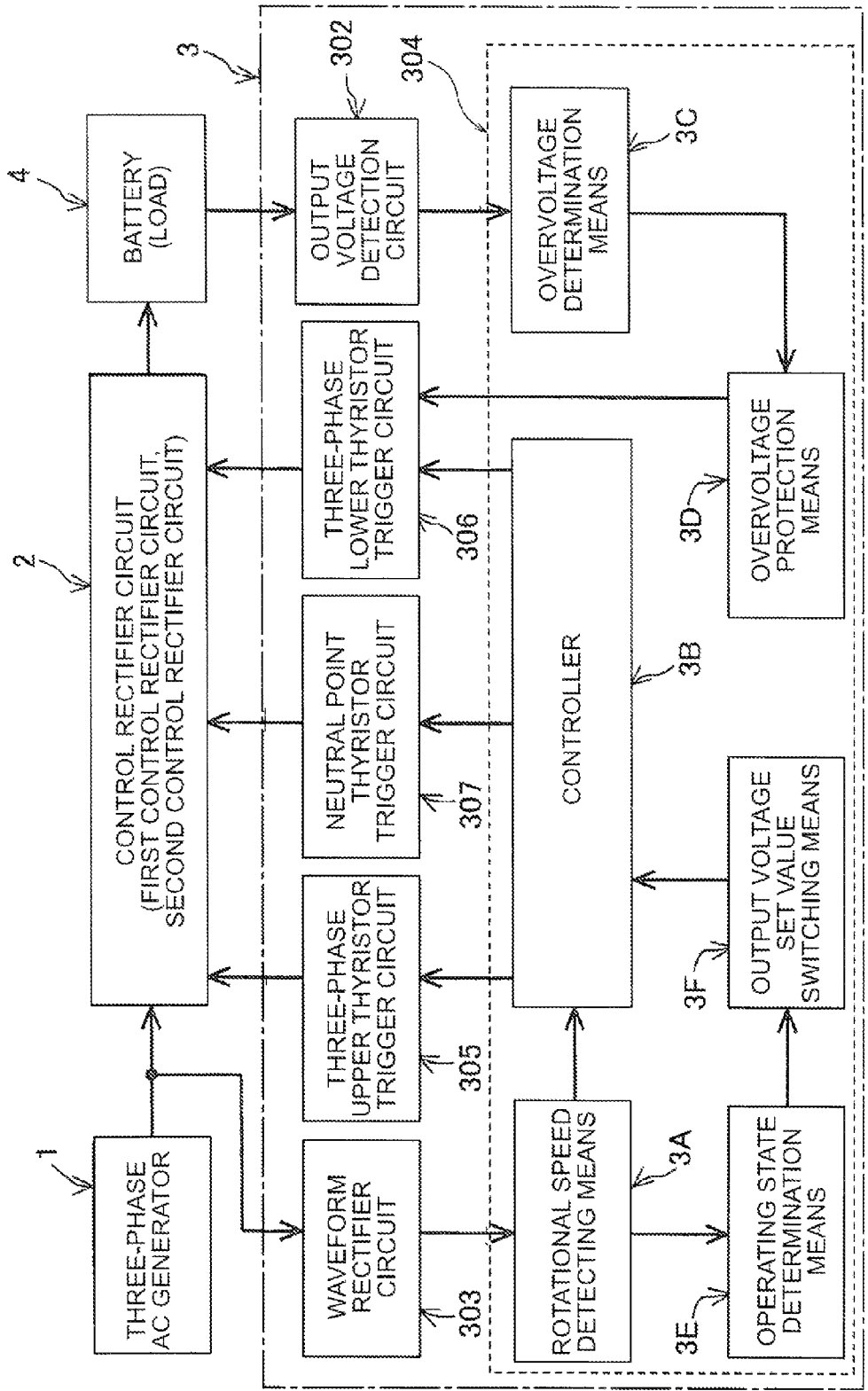
FIG. 2 is a block diagram showing the overall configuration of the power source device including function-implementing means configured by the microprocessor in an embodiment of the present invention.

The microprocessor (MPU) 304 is a computing and processing device which performs various computation processes and signal input/output processes by using RAM to read and execute programs stored in ROM or EEPROM (not shown), and the microprocessor 304 runs upon receiving the power source voltage Vc from the control power source circuit 301. An output voltage detection signal outputted by the output voltage detection circuit 302 and three-phase square wave signals outputted by the waveform rectifier circuit 303 are inputted to the microprocessor 304. In the present embodiment, various function-implementing means are configured by causing the microprocessor 304 to execute predetermined programs. FIG. 2 shows the configuration of the power source device of the present embodiment including the function-implementing means configured by the microprocessor 304.

In the present embodiment, the microprocessor 304 is programmed so as to constitute rotational speed detecting means 3A, a controller 3B, overvoltage determination means 3C, overvoltage protection means 3D, operating state determination means 3E, and output voltage set value switching means 3F.

The rotational speed detecting means 3A is configured so as to compute the rotational speed of the AC generator 1 from the respective generated intervals of the three-phase square wave signals generated sequentially in electrical angles at angular intervals of 120° by the waveform rectifier circuit 303. The rotational speed detecting means 3A perceives whether the square wave signal of each phase is rising or falling, measures the time from the previous inputting of the square wave signal of each phase to the current inputting as rotational speed computation timing data, and computes the rotational speed of the AC generator from this timing data.

The controller 3B is means for generating three-phase upper thyristor trigger commands gu' to gw', three-phase lower thyristor trigger commands gx' to gz', and a neutral point thyristor trigger command gn' at the timings at which the three-phase upper thyristors Su to Sw, the three-phase lower thyristors Sx to Sz, and the neutral point thyristor Sn are respectively triggered.

The controller 3B of the present embodiment is a circuit for controlling, according to the rotational speed of the power generator, the charging electric current flowing from the three-phase magneto coils Lu to Lw to the battery 4 through the control rectifier circuit 2. When the rotational speed detected by the rotational speed detecting means 3A is equal to or less than a set speed, the controller 3B controls the turning on and off of the three-phase upper thyristors Su to Sw and the three-phase lower thyristors Sx to Sz and controls the charging electric current flowing from the magneto coils Lu to Lw to the battery 4 through the control rectifier circuit 2. This control is carried out in order to preserve the output voltage detected by the output voltage detection circuit 302 either equal to or less than the set value or within an adjusted range, while keeping the trigger of the neutral point thyristor Sn stopped. With the neutral point thyristor Sn turned off, a full-bridge three-phase full-wave control rectifier circuit is configured by the three-phase upper thyristors Su to Sw and lower thyristors Sx to Sz. In this circuit, the three-phase AC output of the AC generator 1 inputted through the three-phase AC input terminals 2u through 2w is put through full-wave rectification and outputted from the cathode-side and anode-side DC output terminals 2a and 2b. In the present specification, the control rectifier circuit for putting the three-phase AC output of the AC generator through full-wave rectification in this manner is referred to as the first control rectifier circuit.

In the present specification, "three-phase rectification mode" refers to the rectification mode in which the outputs of the three-phase magneto coils Lu to Lw are put through three-phase full-wave rectification by the control rectifier circuit 2 and supplied to the load.

To drive the load, the voltages of both ends of the load are controlled so as to remain equal to or less than a set value. In cases in which control is performed to preserve the voltages of both ends of the load equal to or less than a set value, the voltages applied to both ends of the load are preserved at a set value in a state in which the output of the AC generator exceeds a set value. An upper limit set value and a lower limit set value can also be set for the voltages of both ends of the load. In cases in which an upper limit set value and a lower limit set value are set for the voltages of both ends of the load, the voltages of both ends of the load are preserved between the upper limit set value and the lower limit set value. In cases in which a battery 4 having a rated voltage of 12 [V] is included in the load, the set value of the output voltage (the upper limit set value) is set to 14 [V], for example.

In the three-phase rectification mode, power is supplied to the load in the following manner (the battery is charged in the present embodiment).

Figure 4:
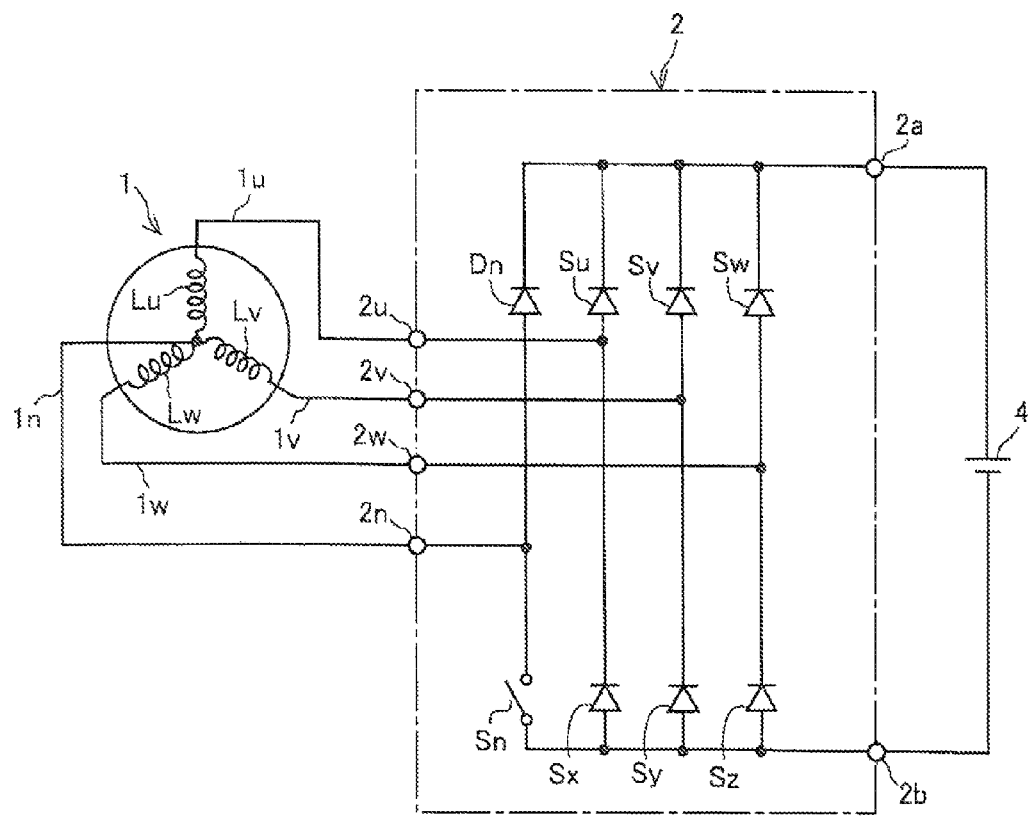
FIG. 4 is a circuit diagram showing an equivalent circuit as the main section during low-speed rotation of the embodiment of FIG. 1.

When the output voltage Vb detected by the output voltage detection circuit 302 is equal to or less than the set value, trigger signals gu to gw and gx to gz are applied respectively to the upper thyristors Su to Sw of the phases U to W and the lower thyristors Sx to Sz of the phases U through W with the trigger of the neutral point thyristor Sn in a stopped state, and of these thyristors, the ones to which forward voltage is applied between the anodes and cathodes are turned on. The AC voltage induced in the magneto coils Lu to Lw of the phases U through W are thereby put through full-wave rectification and a charging electric current is supplied to the battery 4. In the three-phase rectification mode, when the output voltage Vb is equal to or less than the set value, the control rectifier circuit 2 can be represented as the equivalent circuit shown in FIG. 4. In the equivalent circuit shown in FIG. 4, thyristors that have received a trigger signal and turned on when forward voltage is applied between the anodes and cathodes are represented as circuit symbols indicating diodes, and thyristors that do not receive a trigger signal and remain off are represented as circuit symbols indicating switches that are off. The same applies to the equivalent circuits of FIGS. 5 through 7, described hereinafter.

In the three-phase rectification mode, when the output voltage Vb exceeds the set value, trigger signals stop being supplied to the upper thyristors Su to Sw of the phases U to W and to the lower thyristors Sx to Sz of the phases U through W and these thyristors are sequentially turned off, whereby the battery 4 is no longer charged. The voltages of both ends of the battery 4 are kept equal to or less than the set value by repeating these actions.

Figure 9:
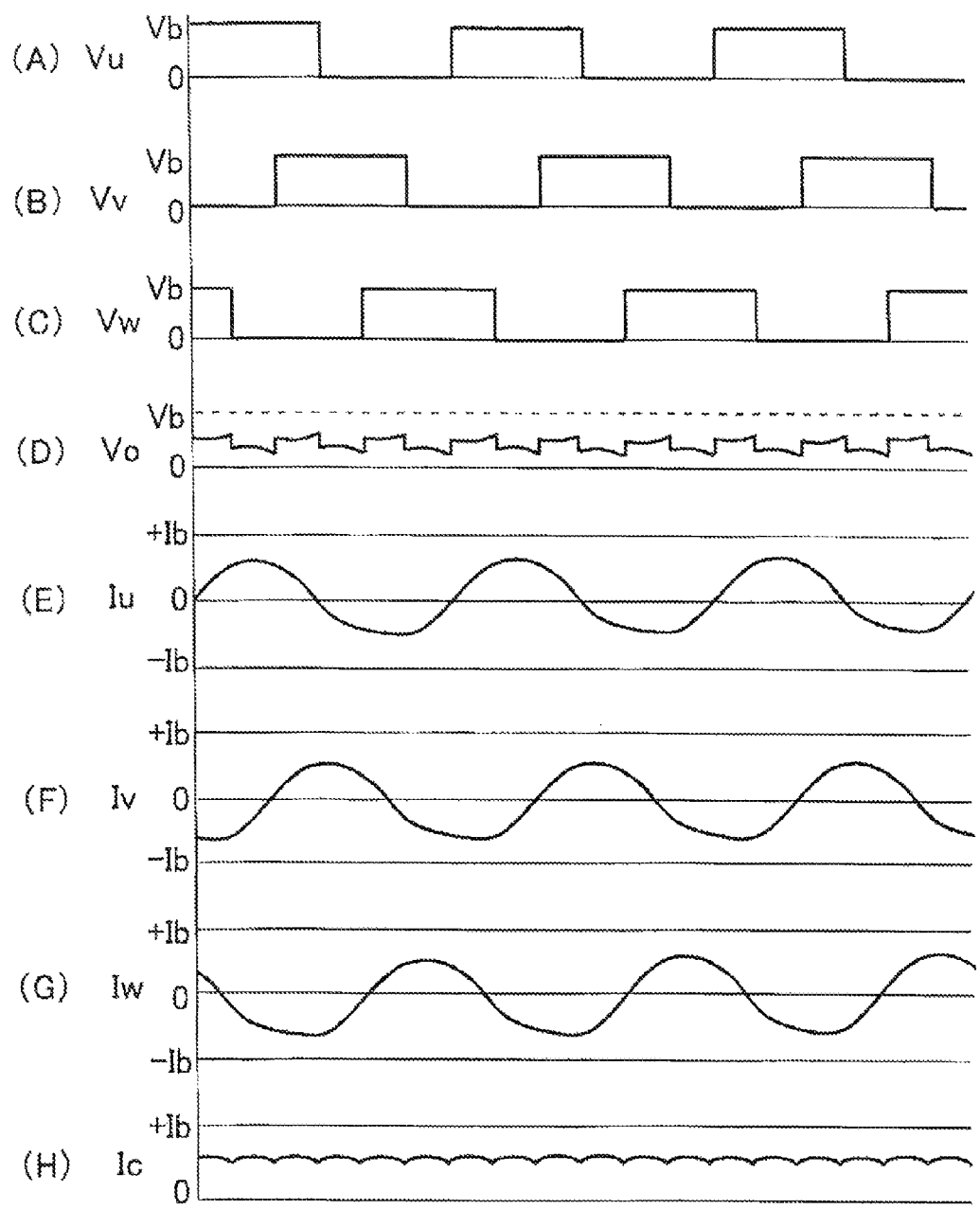
FIG. 9 is a waveform chart showing the voltage and current waveforms of the components in an embodiment of the present invention when power is supplied to the load including the battery in the three-phase rectification mode.

FIG. 9 shows voltage waveforms and current waveforms of the components measured when the battery is charged in the three-phase rectification mode. FIGS. 9(A), (B), and (C) respectively show AC voltages Vu, Vv, and Vw (see FIG. 1) that arise between the AC output terminals 1u through 1w of the phases U through W of the AC generator and the anode-side DC output terminal 2b of the control rectifier circuit 2, and FIG. 9(D) shows a neutral point voltage V0 that arises between the neutral point terminal 1n of the AC generator and the anode-side DC output terminal 2b. FIGS. 9(E), (F), and (G) respectively show load currents Iu, Iv, and Iw flowing through the U-phase, V-phase, and W-phase magneto coils, and FIG. 9(H) shows a charging current Ic flowing to the battery 4.

During three-phase charging, the voltages Vu, Vv, and Vw that arise between the AC output terminals 1u through 1w of the phases U through W of the AC generator and the anode-side DC output terminal 2*b* of the control rectifier circuit 2 simultaneously increase to the output voltage Vb when the upper thyristors and the lower thyristors are turned on. Therefore, the voltages Vu, Vv, and Vw have a square waveform wherein the peak value is the output voltage Vb as shown in FIGS. 9(A), (B), and (C). When the AC generator is in three-phase operation, the neutral point voltage V0 in principle should be zero, but it is not actually zero as shown in FIG. 9(D) due to factors such as the slight difference in the number of turns of the three-phase magneto coils and the difference in magnetic resistance in the magnetic paths of the magnetic fluxes that link in the three-phase magneto coils, and a slight change in level is shown every time a thyristor is switched, causing the voltages Vu, Vv, and Vw to rise and fall.

Figure 8:
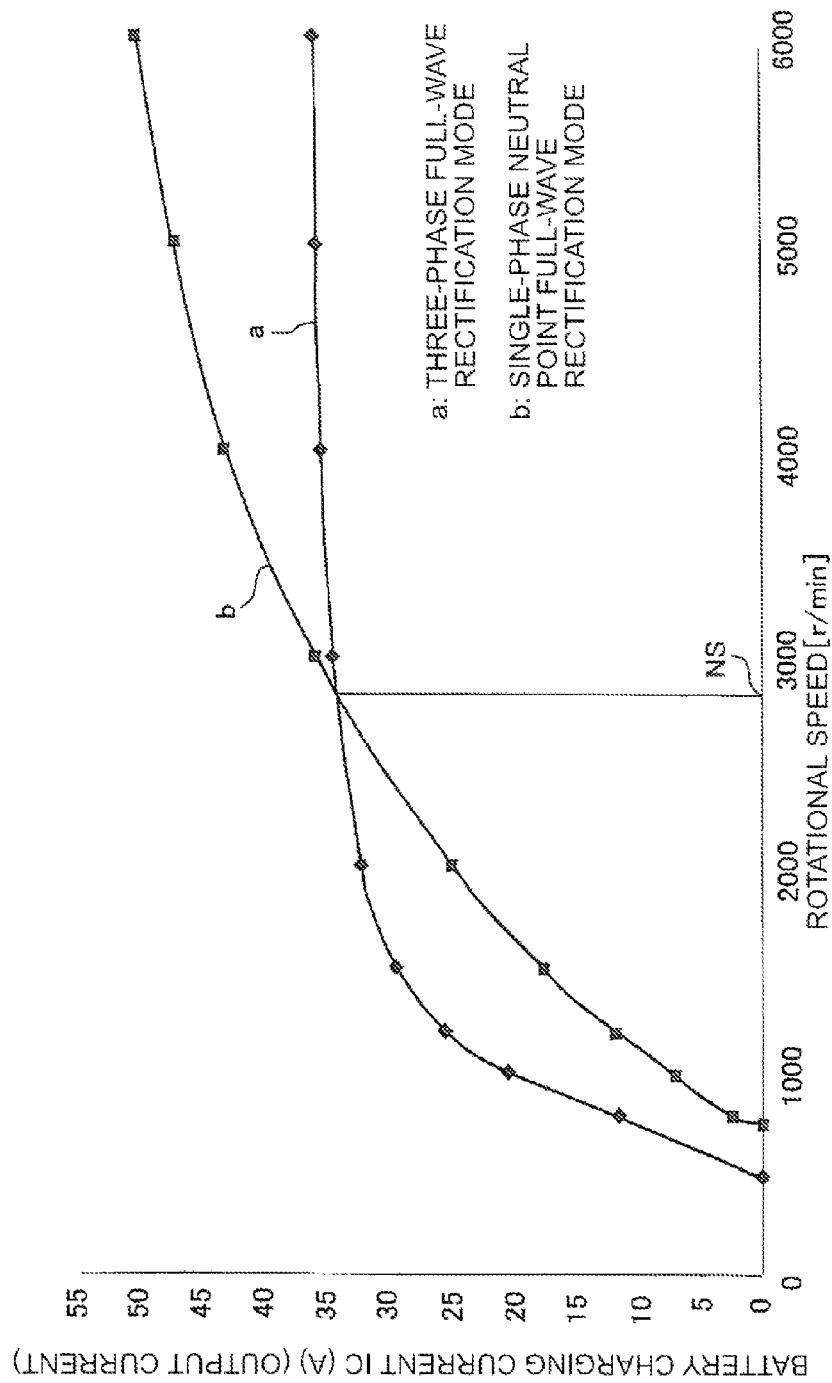
FIG. 8 is a graph showing the relationship between the rotational speed of the AC generator and the output current in an embodiment of the present invention, when power is supplied to the load including the battery in the three-phase rectification mode and when power is supplied to the load including the battery in the single-phase neutral point rectification mode.

When charging is performed in the three-phase rectification mode throughout the entire rotational speed range from low-speed rotation to high-speed rotation of the AC generator, the battery charging characteristics relative to rotational speed are as shown by the curve a of FIG. 8. The horizontal axis of FIG. 8 shows the rotational speed of the AC generator, and the vertical axis shows the charging current (output current) flowing to the battery. As is clear from FIG. 8, when the load is driven in the three-phase rectification mode, a high output can be taken from the control rectifier circuit in the low rotational speed range of the AC generator, but in the high rotational speed range, less output can be taken from the control rectifier circuit due to a decrease in power generation output cause by an armature reaction. Consequently, in the present invention, charging in the three-phase rectification mode is performed only when the rotational speed of the AC generator is equal to or less than the set value.

As described above, in the low-speed range in which the rotational speed of the AC generator is equal to or less than the set speed, because current is supplied from the three-phase magneto coils Lu, Lv, and Lw of the AC generator to the load through the control rectifier circuit 2, the winding design of the three-phase magneto coils is set in advance so that sufficient output is generated in the low-speed rotation range, whereby the battery 4 can be sufficiently charged and sufficient power can be supplied to the load 6 connected to the battery.

The controller 3B is also configured so that when the rotational speed of the AC generator detected by the rotational speed detecting means exceeds the set speed, the controller constantly triggers the neutral point thyristor Sn, stops triggering the upper thyristor and lower thyristor of any one phase selected from the three phases, and with the magneto coil of this phase in a non-load state, controls the turning on and off of the upper thyristors and lower thyristors of the other two selected phases.

Figure 7:
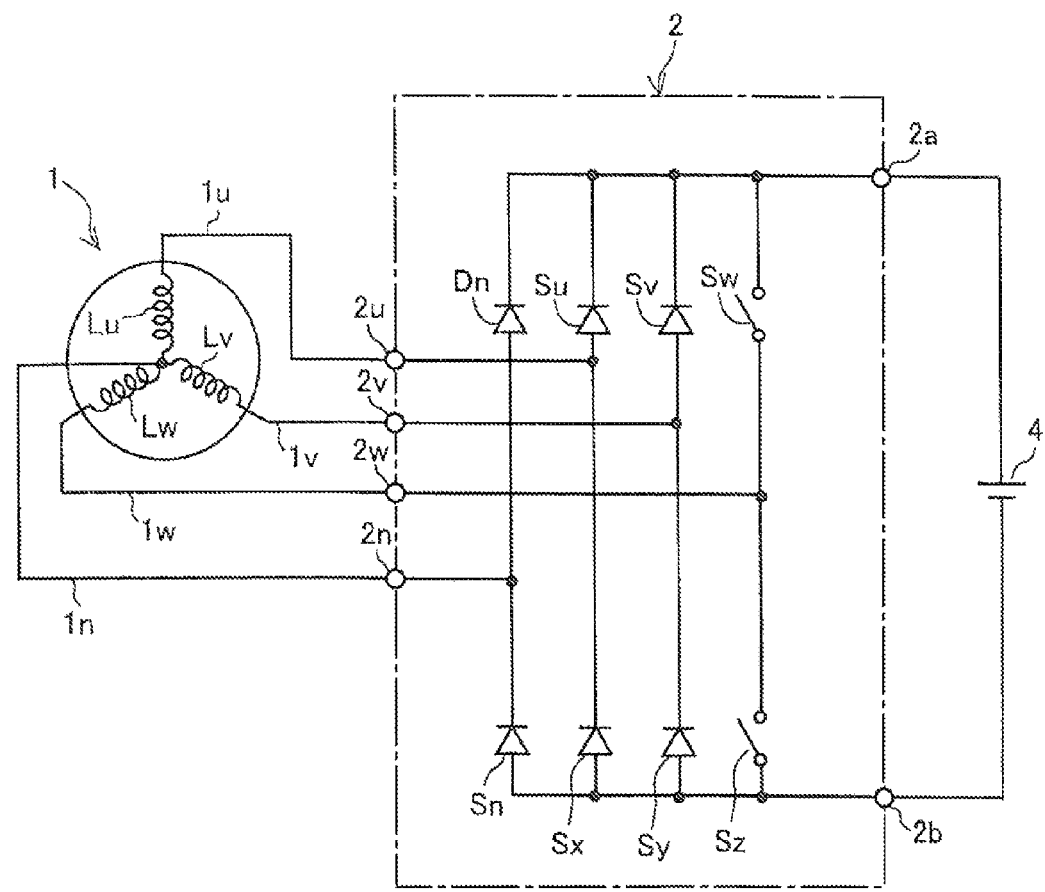
FIG. 7 is a circuit diagram showing an equivalent circuit as the main section at yet another timing during high-speed rotation in the embodiment of FIG. 1.

As in the equivalent circuit shown in FIG. 7, for example, with the neutral point thyristor Sn being constantly triggered and kept on and the triggering of the W-phase upper thyristor Sw and lower thyristor Sz stopped to keep these thyristors Sw and Sz off, the turning on and off of the U-phase upper thyristor Su and lower thyristor Sx and the V-phase upper thyristor Sv and lower thyristor Sy are controlled so that the output voltage Vb is kept equal to or less than the set value.

Thus, with the neutral point thyristor Sn constantly being triggered and the triggering of the upper thyristor and lower thyristor of one selected phase having been stopped, full-wave rectification is performed on the single-phase AC voltages obtained between the neutral point terminal and each of the AC output terminals of the other two phases selected from the three-phase AC output terminals of the AC generator, and also on the single-phase AC voltage obtained between the AC output terminals of the selected two phases, and these voltages are supplied to the load.

A case is considered, for example, in which the U-phase and the V-phase are the two selected phases, the neutral point thyristor Sn is constantly being triggered and kept on, and the W-phase upper thyristor Sw and lower thyristor Sz stop being triggered to keep these thyristors Sw and Sz turned off; and in this state, the turning on and off of the U-phase upper thyristor Su and lower thyristor Sx and the V-phase upper thyristor Sv and lower thyristor Sy are controlled. In this case, the single-phase AC voltage obtained between the U-phase AC output terminal 1*u* and the neutral point terminal 1*n*, the single-phase AC voltage obtained between the AC output terminal 1*v* and the neutral point terminal 1*n*, and the single-phase AC voltage obtained between the AC output terminals 1*u*, 1*v* are put through full-wave rectification by the control rectifier circuit configured by the thyristors Sn, Sx, and Sy, and the voltages are supplied to the load.

In the present specification, the term "second control rectifier circuit" is used to refer to the control rectifier circuit which is configured by the upper thyristors and lower thyristors of the two phases selected from the three phases, the neutral point diode, and the neutral point thyristor; and which performs full-wave rectification on the single-phase AC voltages obtained between the neutral point terminal and each of the AC output terminals of the selected two phases, and also on the single-phase AC voltage obtained between the AC output terminals of the selected two phases. The term "single-phase neutral point rectification mode" is used in the present specification to refer to the rectification mode in which the output of the AC generator is rectified through the second control rectifier circuit and supplied to the load.

Figure 10:
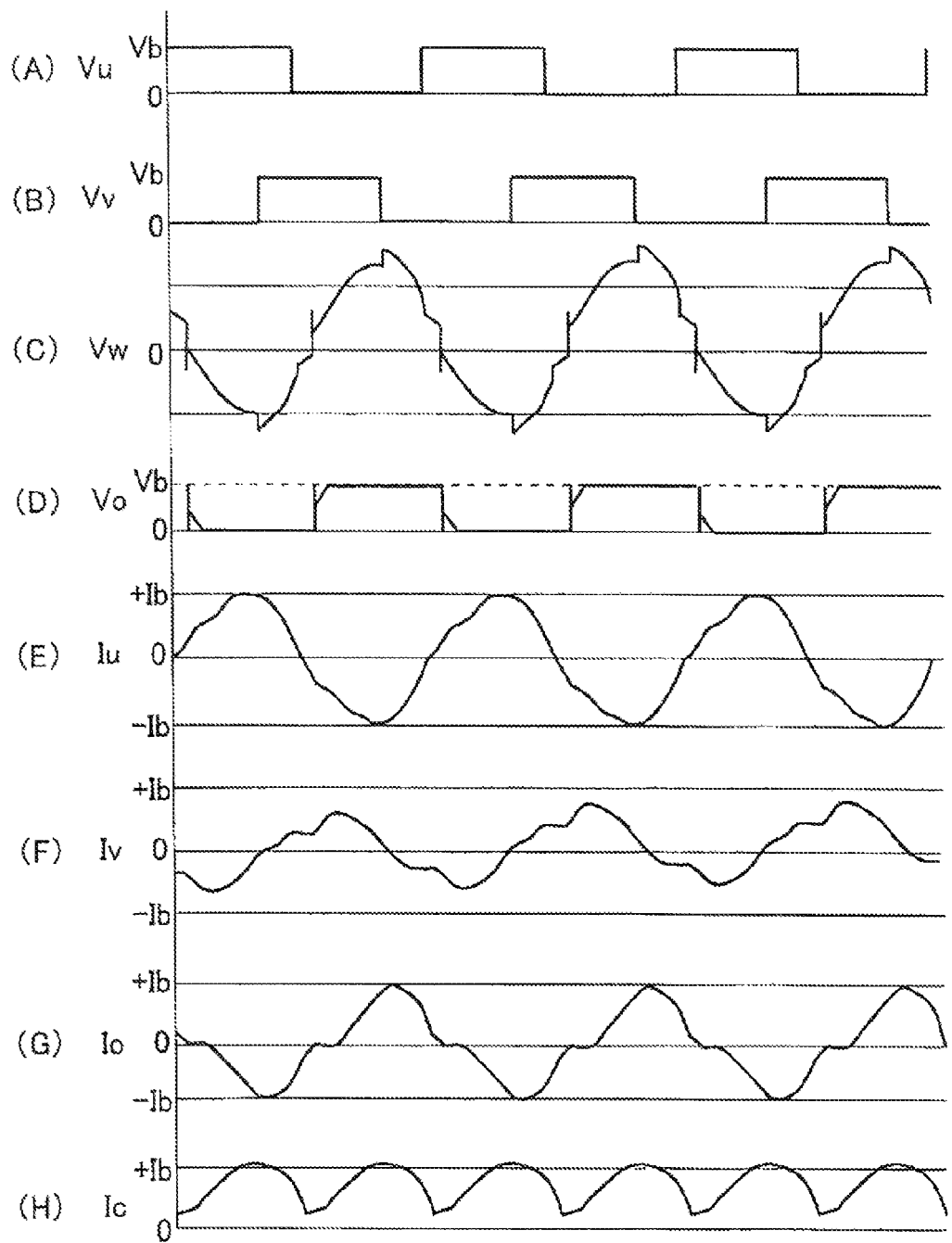
FIG. 10 is a waveform chart showing the voltage and current waveforms of the components in an embodiment of the present invention when power is supplied to the load including the battery in the single-phase neutral point rectification mode with the rotational speed of the AC generator at 2500 rpm.
Figure 11:
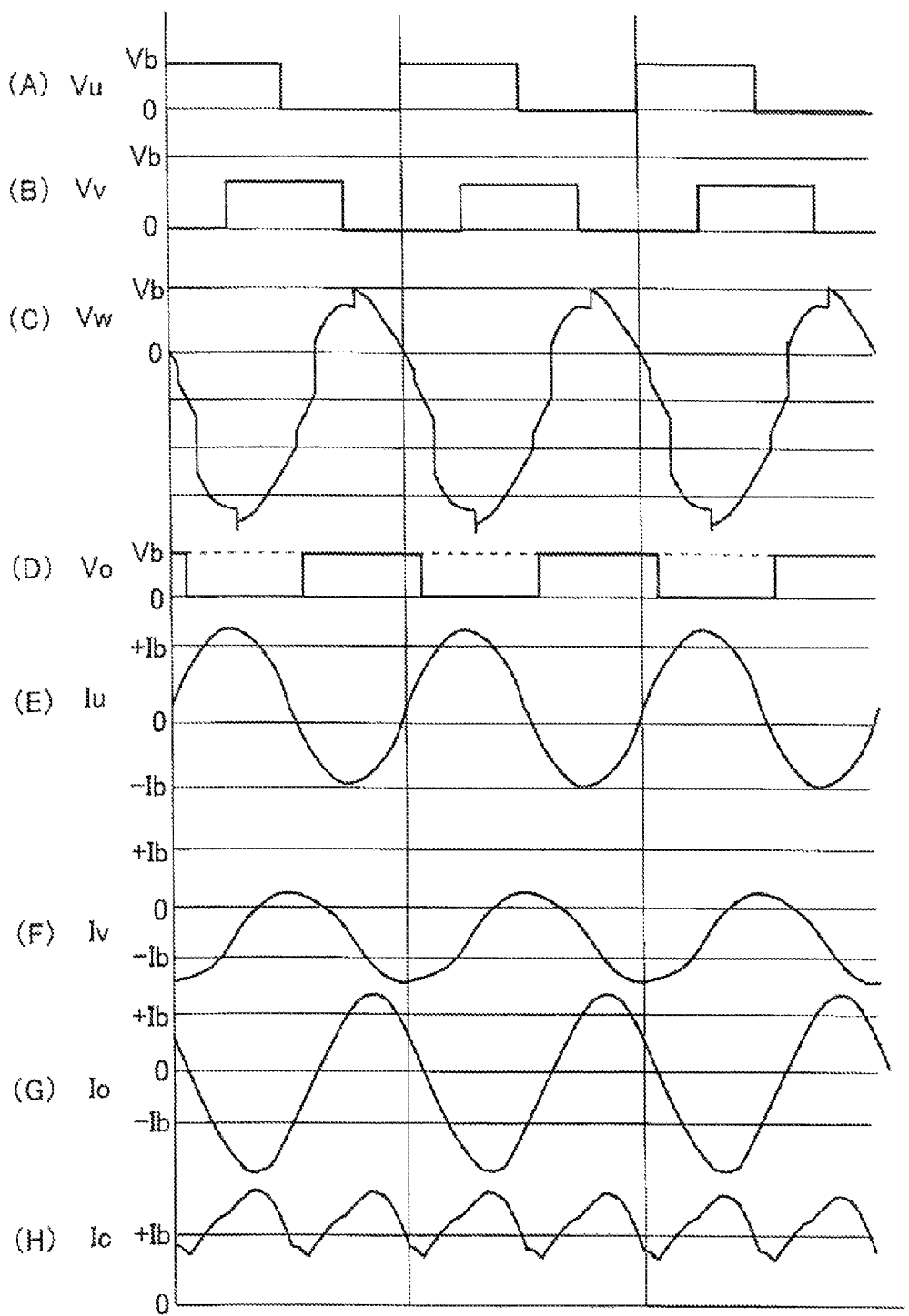
FIG. 11 is a waveform chart showing the voltage and current waveforms of the components in an embodiment of the present invention when power is supplied to the load including the battery in the single-phase neutral point rectification mode with the rotational speed of the AC generator at 5000 rpm.

Referring to FIGS. 10 and 11, these charts show the voltage waveforms and current waveforms of the components measured in a case during the single-phase neutral point rectification mode, wherein the neutral point thyristor Sn is constantly being triggered and kept on and the W-phase upper thyristor Sw and lower thyristor Sz being kept off, and the turning on and off of the U-phase upper thyristor Su and lower thyristor Sx and the V-phase upper thyristor Sv and lower thyristor Sy is controlled so as to keep the output voltage Vb equal to or less than the set value. FIG. 10 shows a case in which the rotational speed of the AC generator is 2500 rpm, and FIG. 11 shows a case in which the rotational speed of the AC generator is 5000 rpm.

In FIGS. 10 and 11, (A), (B), and (C) respectively show the voltages Vu, Vv, and Vw (see FIG. 1) that respectively arise between the AC output terminals 1*u* through 1*w* of the phases U through W of the AC generator and the anode-side DC output terminal 2*b* of the control rectifier circuit 2, and (D) shows a neutral point voltage V0 that arises between the neutral point terminal in of the AC generator and the anode-side DC output terminal 2*b*. (E), (F), and (G) respectively show load currents Iu, Iv, and Iw flowing through the U-phase, V-phase, and W-phase magneto coils, and (H) shows a charging current Ic flowing to the battery 4.

In the single-phase neutral point rectification mode, the battery is charged in the following manner, for example.

When the output voltage Vb is detected to be equal to or less than the set value by the output voltage detection circuit 302, the W-phase upper thyristor Sw and lower thyristor Sz stop being triggered, for example (the thyristors Sw and Sz are kept turned off). The trigger signals gu and gx are also sent respectively to the U-phase upper thyristor Su and lower thyristor Sx, and trigger signals gv and gy are sent respectively to the V-phase upper thyristor Sv and lower thyristor Sy.

Of the thyristors Su, Sx, and Sy, those to which forward voltage is being applied between the anodes and cathodes are turned on. As a result, the AC voltages induced in the U- and V-phase magneto coils Lu and Lv are rectified and a charging current is supplied to the battery 4. In the single-phase neutral point rectification mode, the state of the control rectifier circuit when the output voltage is equal to or less than the set value can be represented with the equivalent circuit shown in FIG. 7.

When the output voltage Vb is equal to or less than the set value, the following energizing paths are formed: the U-phase magneto coil Lu—the thyristor Su—the battery 4 and load 6—the neutral point thyristor Sn—the magneto coil Lu; the V-phase magneto coil Lv—the thyristor Sv—the battery 4 and load 6—the neutral point thyristor Sn—the magneto coil Lv; the magneto coil Lu—the thyristor Su—the battery 4 and load 6—the thyristor Sy—the magneto coil Lv—the magneto coil Lu; and the magneto coil Lv—the thyristor Sv—the battery 4 and load 6—the thyristor Sx—the magneto coil Lu—the magneto coil Lv. Current is supplied from the magneto coils Lu and Lv to the battery 4 and load 6 through the control rectifier circuit 2.

When the thyristors Sw and Sz are turned off and the magneto coil Lw is cut off from the battery 4 and load 6 as shown in FIG. 7, the neutral point diode Dn is forward-biased for the duration from the timing at which the absolute value of the induced voltage of the negative half-wave of the U-phase magneto coil Lu (the half-wave in which the neutral point has positive polarity) exceeds the absolute value of the induced voltage of the positive half-wave of the V-phase magneto coil Lv, until the timing at which the absolute value of the induced voltage of the positive half-wave of the U-phase magneto coil Lu exceeds the absolute value of the induced voltage of the negative half-wave of the V-phase magneto coil Lv (the duration equivalent to the positive half-wave of the induced voltage of the W-phase magneto coil Lw cut off from the battery). Additionally, the neutral point voltage Vo of the AC generator increases to the output voltage Vb as shown in (D) of FIGS. 10 and 11. For the duration in which the neutral point voltage V0 increases, current is flowing from the neutral point terminal 1n of the AC generator through the neutral point diode Dn, the battery 4 and load 6, and the U-phase lower thyristor Sx or the V-phase lower thyristor Sy.

As described above, when the single-phase magneto coil Lw is cut off from the battery 4 to create a non-load state over the range in which the rotational speed of the AC generator exceeds the set speed, the total number of turns of the magneto coil can be reduced to reduce the armature reaction, and the decrease in output of the AC generator in the high-speed rotation range caused by the armature reaction can therefore be suppressed.

For the duration equivalent to the positive half-wave of the induced voltage of the magneto coil of the phase cut off from the battery, the neutral point voltage V0 can be increased to the output voltage Vb and current can be supplied from the neutral point terminal 1n to the battery 4 and load 6 through the control rectifier circuit 2, and the power that can be supplied to the battery 4 and load 6 in the high-speed rotation range can therefore be increased in conjunction with suppressing the decrease in power generation output caused by the armature reaction.

Assuming power is supplied to the load in the single-phase neutral point rectification mode throughout the entire range of engine speeds, the output characteristics of the power source device relative to rotational speed are as shown by the curve b of FIG. 8. In a low rotational speed range, output is less than when power is supplied to the load in the three-phase rectification mode, and in a high rotational speed range, output is greater than when power is supplied to the load in the three-phase rectification mode. Consequently, if the rotational speed Ns at the intersection between curve a and curve b of FIG. 8 is the set speed, power is supplied to the load in the three-phase rectification mode when the rotational speed of the AC generator is equal to or less than the set speed Ns, and power is supplied to the load in the single-phase neutral point rectification mode throughout the range in which the rotational speed of the AC generator exceeds the set speed Ns. The power that can be supplied to the load throughout the entire range of rotational speeds of the AC generator can therefore be increased.

As described above, when a magneto coil of one phase is in a non-load state throughout the range in which the rotational speed exceeds the set speed, there will sometimes be an excessive increase in the temperature of one of the magneto coils of the other two phases through which a load current flows. This is thought to be due to the fact that a cessation of the magnetic flux from the magneto coil of one phase in a non-load state causes the magnetic flux flowing through the armature core to be unbalanced, the magnetic fluxes linked to the magneto coils of the two phases conducting the load current to be nonuniform, and a large current to flow to the magneto coil of a specified phase.

To prevent such problems from occurring, in the present embodiment, the controller 3B is configured so as to switch the AC output terminals of two selected phases at certain time intervals when the detected rotational speed exceeds the set speed. Specifically, the controller 3B for controlling the control rectifier circuit is configured so as to switch the phase of stopping the triggers of the upper thyristors Su to Sw and the lower thyristors Sx to Sz at certain time intervals (cessation phase switching time intervals) when performing control for keeping the output voltage equal to or less than the set value in a state in which the rotational speed of the AC generator detected by the rotational speed detecting means 3A exceeds the set speed.

Figure 5:
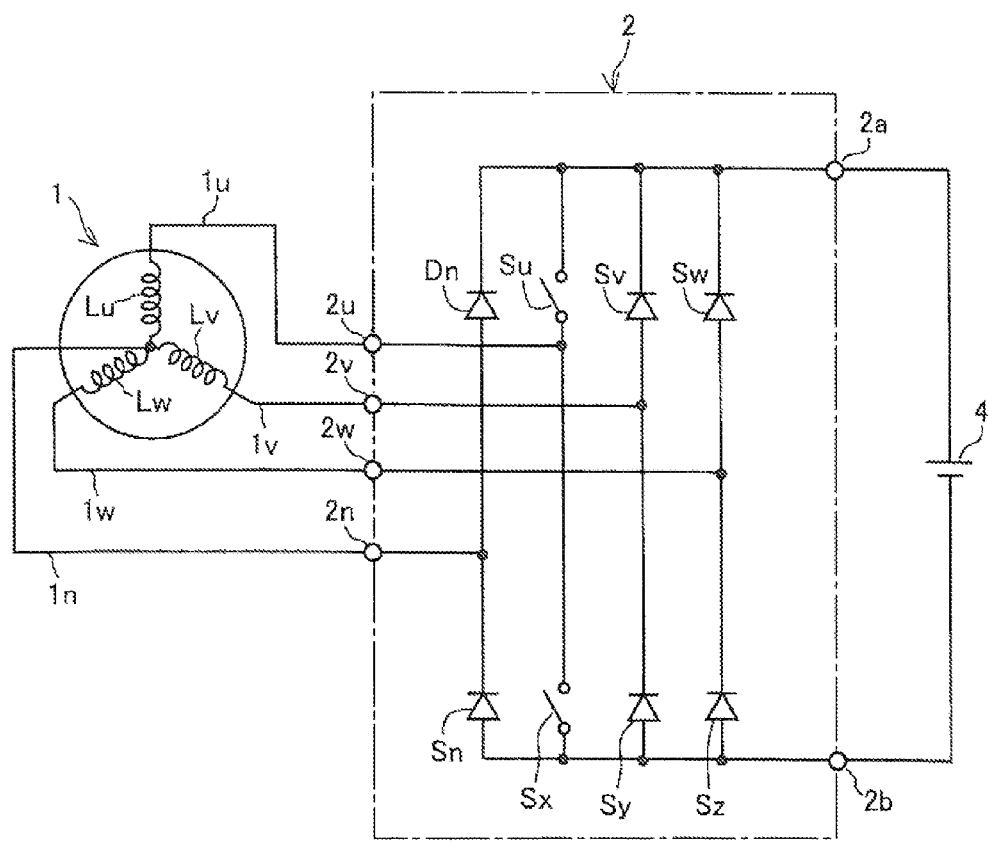
FIG. 5 is a circuit diagram showing an equivalent circuit as the main section at a certain timing during high-speed rotation in the embodiment of FIG. 1.

For example, when the output voltage is equal to or less than the set value in a state in which the rotational speed of the AC generator detected by the rotational speed detecting means exceeds the set speed, first, the triggers of the U-phase upper thyristor Su and lower thyristor Sx are stopped as shown in FIG. 5, and the turning on and off of the V-phase upper thyristor Sv and lower thyristor Sy and the W-phase upper thyristor Sw and lower thyristor Sz are controlled so as to keep the output voltage equal to or less than the set value. Specifically, when the output voltage is detected as being equal to or less than the set value, trigger signals gv and gy are sent respectively to the V-phase upper thyristor Sv and lower thyristor Sy, trigger signals gw and gz are sent respectively to the W-phase upper thyristor Sw and lower thyristor Sz. Of the thyristors Sv, Sy, Sw, and Sz, those to which forward voltage is being applied between the anodes and cathodes are turned on, whereby a charging current is supplied from the V- and W-phase magneto coils Lv and Lw to the battery 4 through the control rectifier circuit 2. When the detected output voltage exceeds the set value, the trigger signals gv and gy stop being supplied to the V-phase upper thyristor Sv and lower thyristor Sy, and the trigger signals gw and gz stop being supplied to the W-phase upper thyristor Sw and lower thyristor Sz. The thyristors Sv, Sy, Sw, and Sz are thereby turned off, and the charging current stops being supplied to the battery 4.

Figure 6:
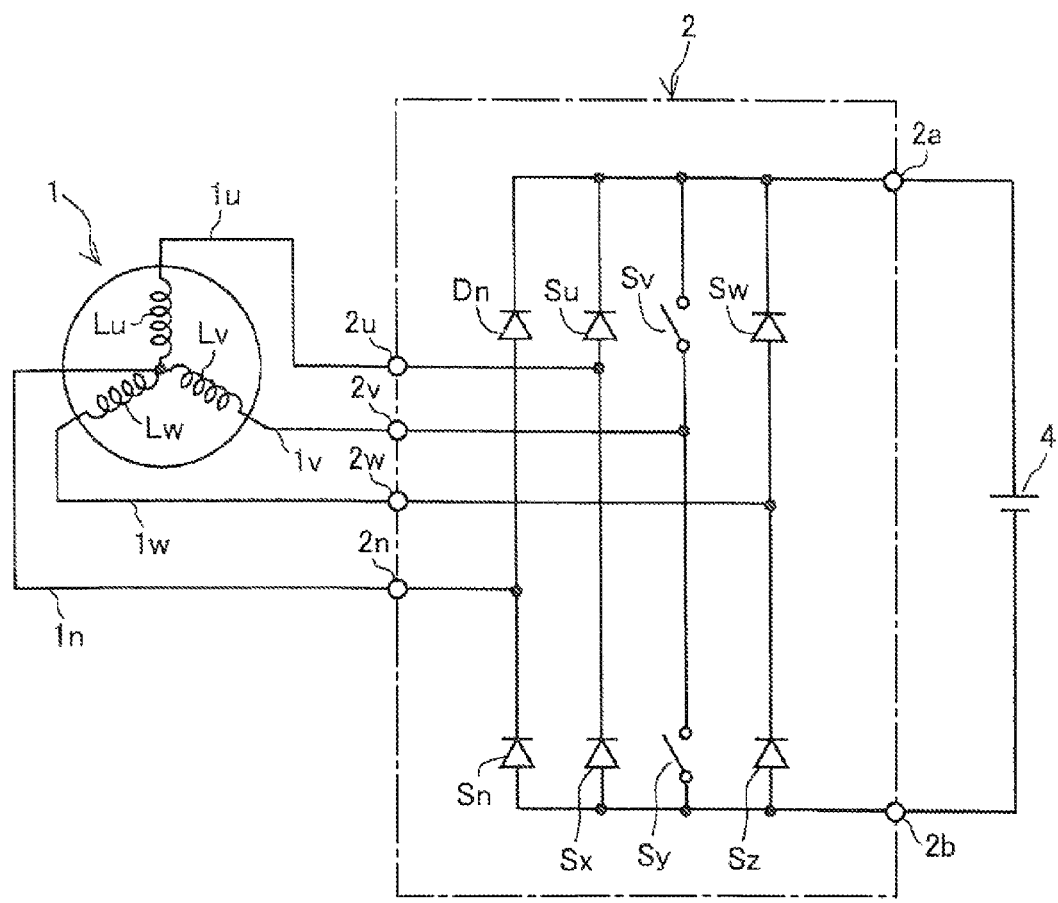
FIG. 6 is a circuit diagram showing an equivalent circuit as the main section at another timing during high-speed rotation in the embodiment of FIG. 1.

When the time of stopping the triggers of the U-phase upper thyristor Su and lower thyristor Sx (the cessation phase switching time) reaches a set time as shown in FIG. 5, the phase whose triggers are stopped is switched to the V-phase as shown in FIG. 6, stopping the triggers of the V-phase upper thyristor Sv and lower thyristor Sy. In this state, similar to the above description, the turning on and off of the U-phase upper thyristor Su and lower thyristor Sx and the W-phase upper thyristor Sw and lower thyristor Sz is controlled to perform control for keeping the output voltage equal to or less than the set value.

When the time of stopping the triggers of the V-phase upper thyristor Sv and lower thyristor Sy reaches a set time, the phase whose triggers are stopped is switched to the W-phase as shown in FIG. 7. With the triggers of the W-phase upper thyristor Sw and lower thyristor Sz in a stopped state, the turning on and off of the U-phase upper thyristor Su and lower thyristor Sx and the V-phase upper thyristor Sv and lower thyristor Sy is controlled, thereby performing control for keeping the output voltage equal to or less than the set value.

As described above, the turning on and off of the upper thyristor and lower thyristor of two other phases is controlled while the phase of the upper thyristor and lower thyristor that are off is switched at certain cessation phase switching time intervals, and control is performed for keeping the output voltage equal to or less than the set value. When such control is performed, the upper thyristor and lower thyristor constituting the second control rectifier circuit will be switched at certain time intervals.

As described above, the controller is configured so as to switch the phase whose triggers of the upper thyristor and lower thyristor are stopped at certain cessation phase switching time intervals (switching the selected two phases supplied with trigger signals at certain time intervals) when the rotational speed detected by the rotational speed detecting means exceeds the set speed. In such a case, there is no problem of increased temperature of the magneto coil of the specified phase in the range in which the rotational speed exceeds the set speed, and the power that can be supplied to the load can be increased during both low-speed rotation and high-speed rotation of the AC generator.

Figure 12:
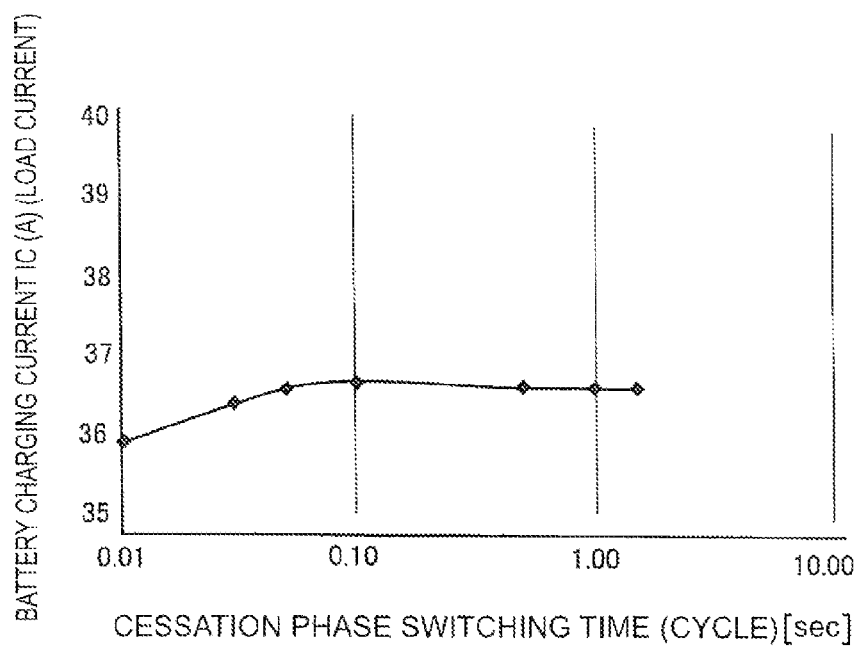
FIG. 12 is a graph showing the relationship between the energization cessation phase switching time and the load current (battery charging current) in an embodiment of the present invention when power is supplied to the load including the battery in the single-phase neutral point rectification mode while the phase not being energized is switched.

When the above-described cessation phase switching time is too short, there is a risk that the current that can be supplied to the battery 4 and load 6 will be insufficient. However, if the cessation phase switching time is set to be longer by at least a certain extent, instances of insufficient current supplied to the battery 4 and load 6 can be prevented. FIG. 12 shows the relationship between the cessation phase switching time and the battery charging current. It is clear from this graph that if the cessation phase switching time is 0.10 [sec] or greater, there is no risk of instances of the charging current being insufficient even if the battery is charged in the single-phase neutral point rectification mode while the phase whose triggers to the upper thyristor and lower thyristor are stopped is switched.

Figure 13:
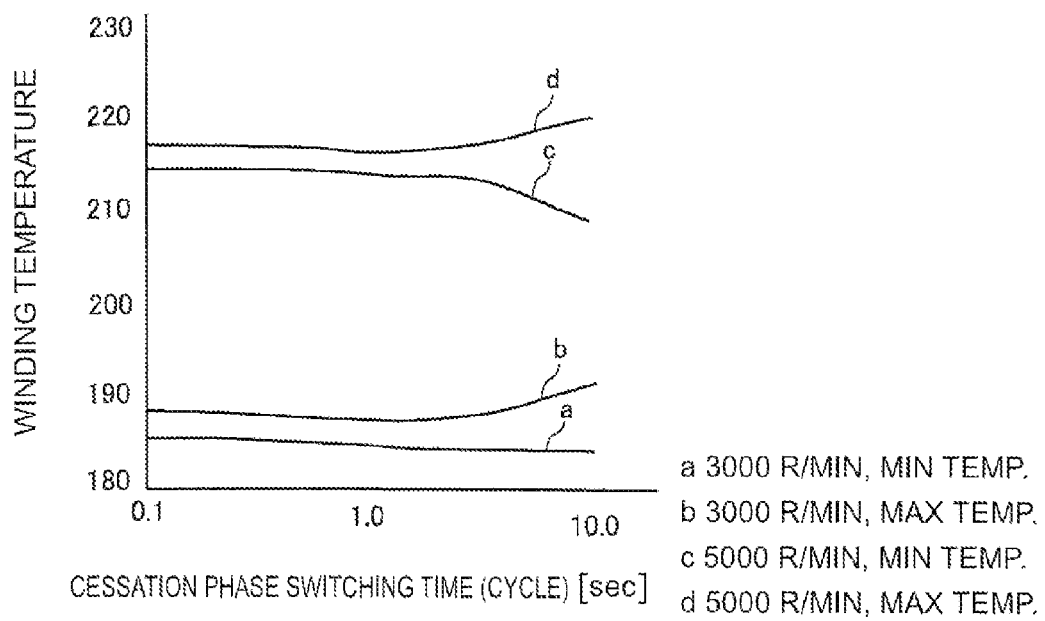
FIG. 13 is a graph showing the relationship between the energization cessation phase switching time and the temperature of the magneto coil in an embodiment of the present invention when power is supplied to the load including the battery in the single-phase neutral point rectification mode while the phase not being energized is switched.

If the cessation phase switching time is long, it is possible to eliminate the risk that the output that can be supplied to the battery and load will decrease. However, when the cessation duration switching time is too long, there is a risk that the temperature (the winding temperature) of the magneto coil of the specified phase will increase excessively. FIG. 13 shows the results of repeating an experiment for measuring the winding temperature while varying the cessation phase switching time. The curves a and b are respectively the minimum value and maximum value of the winding temperature measured when the experiment measuring the winding temperature of the specified phase is repeated while varying the cessation phase switching time, with the rotational speed of the AC generator at 3000 rpm. The curves c and d are respectively the minimum value and maximum value of the winding temperature measured when the experiment measuring the winding temperature of the specified phase is repeated while varying the cessation phase switching time, with the rotational speed of the AC generator at 5000 rpm. It is clear from FIG. 13 that there is no risk of an excessive temperature increase in the magneto coil of the specified phase if the cessation phase switching time is approximately 2.0 [sec] or less. It is clear from FIGS. 12 and 13 that if the cessation phase switching time is set to a range of 0.1 to 2.0 [sec] in the illustrated example, the winding temperature of the specified phase is not increased, and the charging output can be increased in the range in which the rotational speed of the AC generator exceeds the set speed.

The microprocessor 304 is essentially programmed so as to constitute the rotational speed detecting means 3A and controller 3B as described above, but in the present embodiment, the microprocessor 304 is also programmed so as to constitute the overvoltage determination means 3C, the overvoltage protection means 3D, the operating state determination means 3E, and the output voltage set value switching means 3F.

When the battery 4 deteriorates and the internal impedance becomes high, the voltage of both ends of the battery 4 increases excessively when a charging current is supplied to the battery 4 and there is a risk of the control unit being damaged. In the present embodiment, the overvoltage determination means 3C and the overvoltage protection means 3D are provided in order to prevent the voltage of both ends of the battery 4 from increasing excessively.

The overvoltage determination means 3C is means for determining whether the output voltage Vb is equal to or less than an allowable upper limit or above the allowable upper limit, and the overvoltage determination means 3C determines whether the output voltage Vb is equal to or less than the allowable upper limit or above the allowable upper limit by comparing the output voltage detected by the output voltage detection circuit 302 with the set allowable upper limit. The allowable upper limit of the output voltage is set to 18 [V], for example.

The overvoltage protection means 3D is configured so as to allow the three-phase lower thyristors Sx to Sz to be triggered and allow charging of the battery 4 when the output voltage Vb is determined by the overvoltage determination means 3C to be equal to or less than the allowable upper limit, and to stop the triggers of the three-phase lower thyristors Sx to Sz and inhibit charging of the battery 4 when the output voltage Vb is determined by the overvoltage determination means 3C to exceed the allowable upper limit.

The operating state determination means 3E is means for determining the engine operating state from changes in the rotational speed of the AC generator 1 (the engine speed) detected by the rotational speed detecting means 3A, and the output voltage set value switching means 3F is means for switching the set value of the output voltage (or the upper limit of the adjustment range of the output voltage) in accordance with the engine operating state determined by the operating state determination means 3E.

The output voltage set value switching means 3F is configured so as to switch the upper limit of the adjustment range of the output voltage Vb in accordance with the engine operating state determined by the operating state determination means 3E when the output voltage Vb is controlled so as to stay in the adjustment range defined by the upper limit and lower limit.

The operating state determination means 3E is configured so as to determine that the engine operating state is in a decelerating state when the rotational speed of the AC generator detected by the rotational speed detecting means 3A is decreasing at a rate equal to or greater than a set rate of change, for example. When the operating state determination means 3E is configured in this manner, the output voltage set value switching means 3F is configured so as to switch the set value of the output voltage (or the upper limit of the adjustment range of the output voltage) to a value greater than the values during engine operating states other than deceleration, when the engine operating state is determined by the operating state determination means 3E to be a decelerating state. When the set value of the output voltage is switched in this manner, the duration in which charging current is supplied from the AC generator to the battery during engine deceleration can be lengthened to increase the load of the engine, and engine deceleration can therefore be assisted.

The operating state determination means 3E can also be configured so as to determine that the engine operating state is in an accelerating state when the rotational speed of the AC generator detected by the rotational speed detecting means 3A is increasing at a rate equal to or greater than a set rate of change. In this case, the output voltage set value switching means 3F is configured so as to switch the set value of the output voltage (or the upper limit of the adjustment range of the output voltage) to a value less than the values during engine operating states other than acceleration, when the engine operating state is determined by the operating state determination means to be an accelerating state. When the set value of the output voltage is switched in this manner, the duration in which charging current is supplied from the AC generator to the battery during engine acceleration can be shortened to reduce the load of the engine, and engine acceleration can therefore be assisted.

It is possible to appropriately set the set values of output voltage for when the engine operating state is determined to be a decelerating state and when it is determined to be an accelerating state, but in the present embodiment, the set value of the output voltage (a rated value of 12 [V]) is 14 [V] when the engine operating state is in a normal state of neither deceleration nor acceleration, and the set value of the output voltage is switched from 14 [V] to 18 [V] when the engine operating state is determined to be a decelerating state. When the engine operating state is determined to be an accelerating state, the set value of the output voltage is switched from 14 [V] to 10 [V].

The operating state determination means 3E may also be configured so as to determine both that the engine operating state is in a decelerating state and that it is in an accelerating state. The output voltage set value setting means may be configured so as to switch the set value of the output voltage (or the upper limit of the adjustment range of the output voltage) to a value greater than the values during engine operating states other than deceleration when the engine operating state is determined by the operating state determination means 3E to be in a decelerating state, and to switch the set value of the output voltage (or the upper limit of the adjustment range of the output voltage) to a value less than the values during engine operating states other than acceleration when engine operating state is determined by the operating state determination means 3E to be in an accelerating state.

The controller 3B described above is configured so as to generate three-phase upper thyristor trigger commands gu', gv', and gw' at the timings at which the three-phase upper thyristors Su, Sv, and Sw are respectively triggered, to generate three-phase lower thyristor trigger commands gx', gy', and gz' at the timings at which the three-phase lower thyristors Sx, Sy, and Sz are respectively triggered, and to generate a neutral point thyristor trigger command gn' at the timing at which the neutral point thyristor Sn is triggered.

In this case, the three-phase upper thyristor trigger circuit 305 is configured so as to supply trigger signals gu, gv, and gw respectively to the three-phase upper thyristors Su, Sv, and Sw when the controller 3B generates the three-phase upper thyristor trigger commands gu', gv', and gw'. The three-phase lower thyristor trigger circuit 306 is configured so as to supply trigger signals gx, gy, and gz respectively to the three-phase lower thyristors Sx, Sy, and Sz when the controller 3B generates the three-phase lower thyristor trigger commands gx', gy', and gz'. The neutral point thyristor trigger circuit 307 is configured so as to supply the trigger signal gn to the neutral point thyristor Sn when the controller 3B generates the neutral point thyristor trigger command gn'.

The three-phase upper thyristor trigger circuit 305 used in the present embodiment is configured so as to supply trigger signals gu to gw respectively to the three-phase upper thyristors Su to Sw from the three-phase AC output terminals $1u$ to $1w$ of the AC generator when the controller 3B generates the three-phase upper thyristor trigger commands gu', gv', and gw'.

The three-phase lower thyristor trigger circuit 306 is configured so as to supply trigger signals respectively to the three-phase lower thyristors Sx to Sz using the battery 4 as a power source when the controller 3B generates the three-phase lower thyristor trigger commands gx', gy', and gz', and the neutral point thyristor trigger circuit 307 is configured so as to supply a trigger signal to the neutral point thyristor Sn using the battery 4 as a power source when the controller 3B generates the neutral point thyristor trigger command.

Shown in FIGS. 14 through 18 are flowcharts showing an example of an algorithm of a program executed by the microprocessor 304 in order to configure the rotational speed detecting means 3A, the controller 3B, the overvoltage determination means 3C, the overvoltage protection means 3D, the operating state determination means 3E, and the output voltage set value switching means 3F, shown in FIG. 2.

Figure 14:
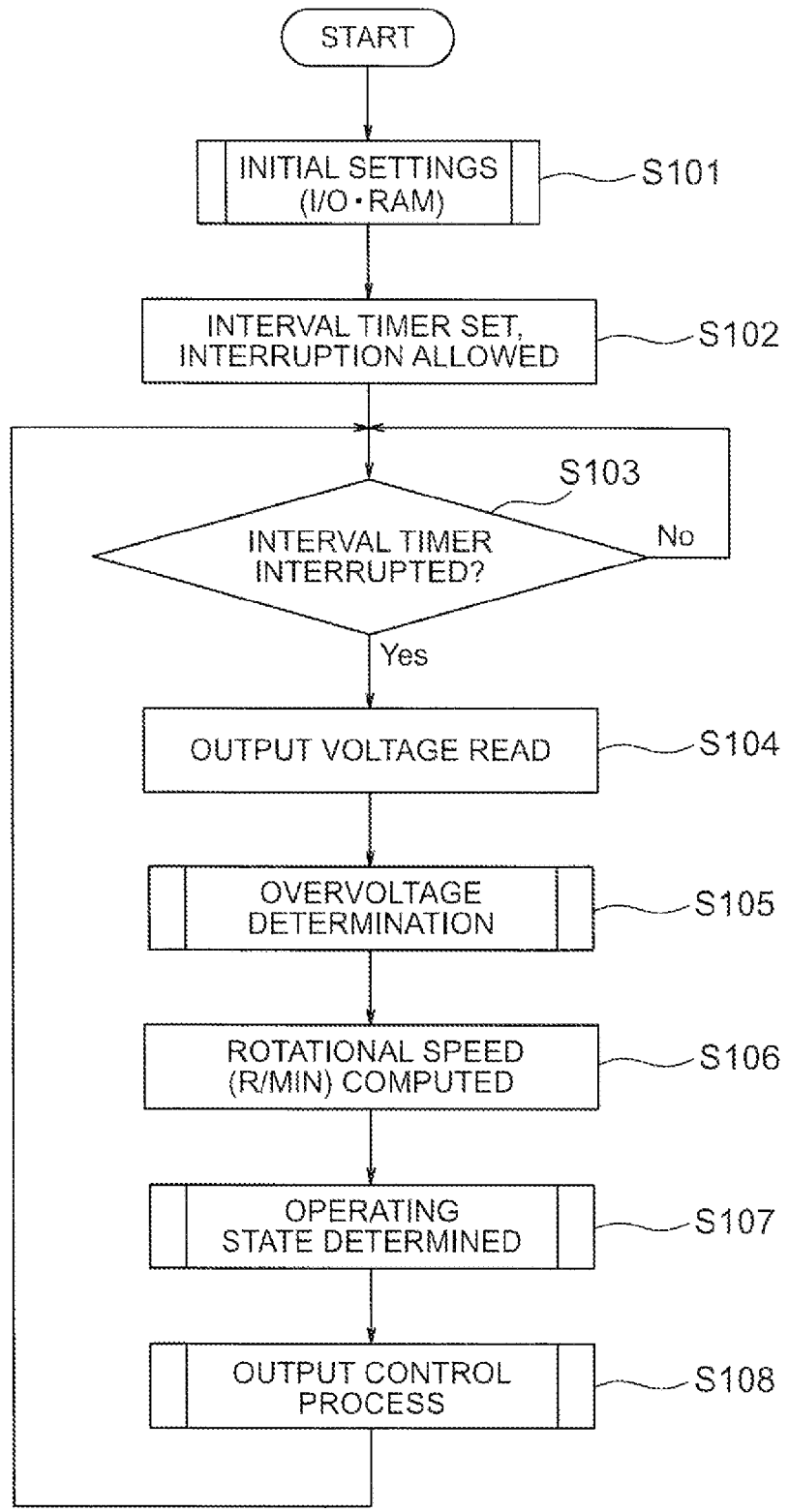
FIG. 14 is a flowchart showing an example of an algorithm of the main routine of the program executed by the microprocessor in an embodiment of the present invention.
Figure 15:
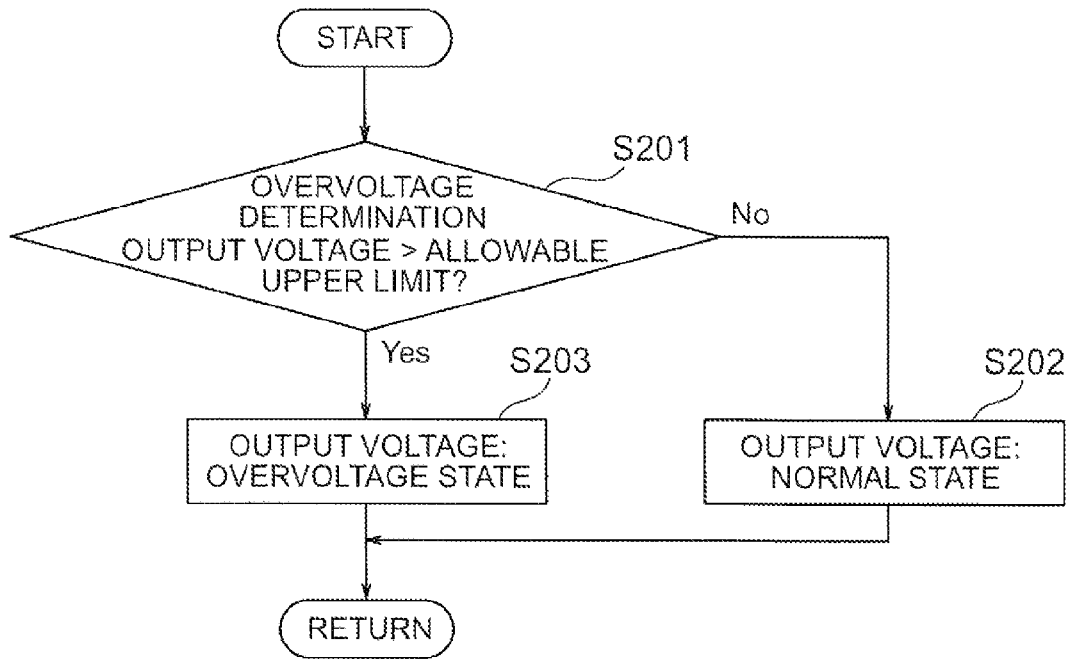
FIG. 15 is a flowchart showing an example of an algorithm of the overvoltage determination process executed at certain time intervals in an embodiment of the present invention.
Figure 16:
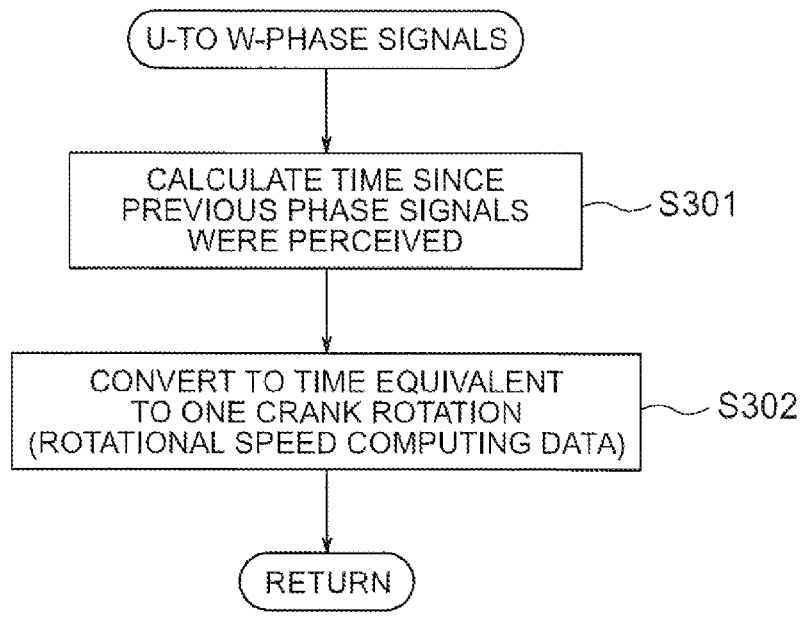
FIG. 16 is a flowchart showing an example of an algorithm of the interruption routine of the program executed in the microprocessor when there is a rising of the positive half-waves of the U-phase output voltage of the AC generator in an embodiment of the present invention.
Figure 17:
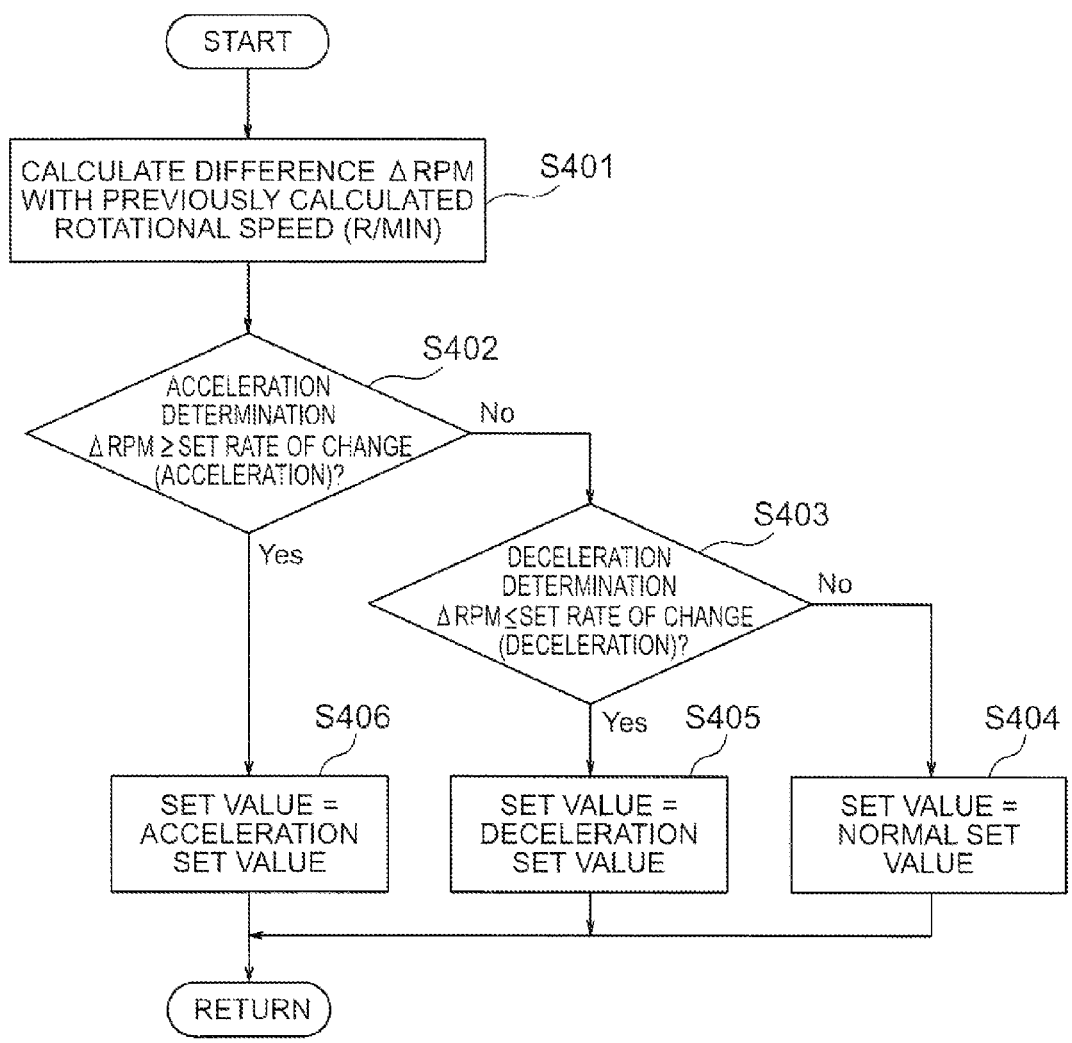
FIG. 17 is a flowchart showing an example of an algorithm of the operating state determination process executed at certain time intervals in an embodiment of the present invention.
Figure 18:
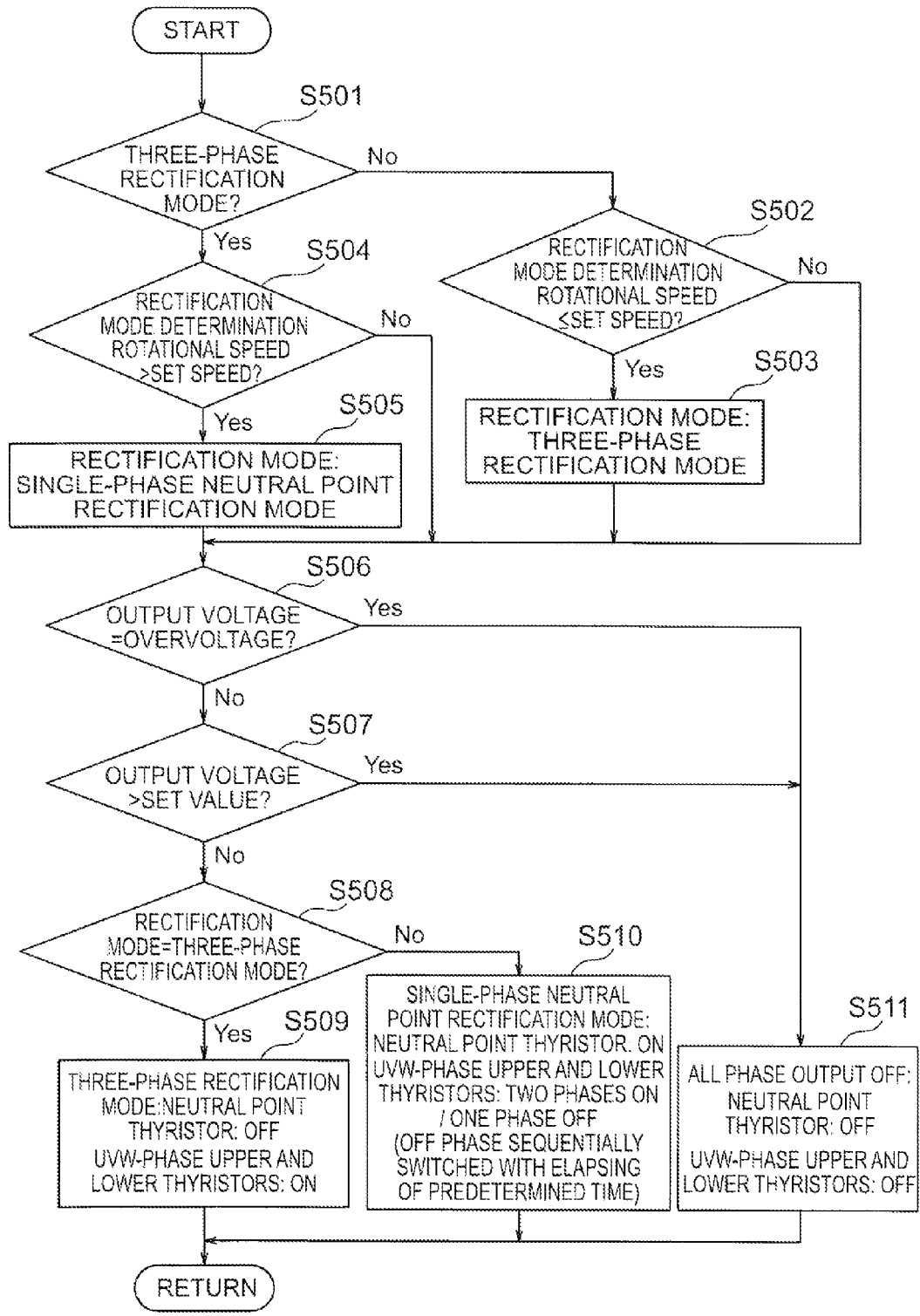
FIG. 18 is a flowchart showing an example of an algorithm of the output control process executed at certain time intervals in an embodiment of the present invention.

FIG. 14 shows the main routine of the program executed by the microprocessor 304. When the power source of the microprocessor 304 is introduced, first, the components are initialized in step S101 of FIG. 14. Next, in step S102, an interval timer is set and an interruption is allowed, after which the sequence advances to step S103 and waits for the interval timer to reach an interruption timing. When it is determined in step S103 that the interval timer has reached the interruption timing, the sequence advances to step S104, the output voltage detected by the output voltage detection circuit 302 is read, and the overvoltage determination process shown in FIG. 15 is performed in step S105. After the overvoltage determination process has been performed, the rotational speed computing data measurement process shown in FIG. 16 is performed in step S106, and the rotational speed of the AC generator is computed from the measured data. After the rotational speed has been computed, the operating state determination process shown in FIG. 17 is performed in step S107 to determine whether the engine operating state is a normal state, a decelerating state, or an accelerating state. Next, the output control process shown in FIG. 18 is performed in step S108, after which the sequence returns to step S103.

In the overvoltage determination process shown in FIG. 15, first, the output voltage is compared with the allowable upper limit in step S201, and when the output voltage is equal to or less than the allowable upper limit, the output voltage is determined to be in a normal state in step S202. When the output voltage exceeds the allowable upper limit, the output voltage is determined to be an overvoltage state in step S203. The overvoltage determination means 3C is configured by the overvoltage determination process of FIG. 15.

The rotational speed computing data measurement process of FIG. 16 is executed every time a rising is perceived in any of the square wave signals of the phases U through W outputted by the waveform rectifier circuit 303. In the rotational speed computing data measurement process of FIG. 16, in step S301, the time is calculated from the last inputting to the current inputting of a U-phase square wave signal outputted by the waveform rectifier circuit 303. When the waveform rectifier circuit 303 is configured so as to generate square wave signals indicating a high duration level for positive half-waves of the induced voltages of the phases of the AC generator and indicating a duration-zero level for negative half-waves, this time calculation is performed, for example, by reading and storing the measured value of a free-running timer when a rising in the square wave signals is perceived, and subtracting the measured value of the timer read when a rising in the previous U-phase square wave signal is perceived from the measured value of the timer read when a rising in the current U-phase square wave signal is perceived. Next, in step S302, the calculated time is converted to a time equivalent to one rotation of the crankshaft of the engine (the time required for the crankshaft to rotate once), and this time equivalent to one rotation is stored in memory as U-phase rotational speed computing data.

Similarly, every time a rising is perceived in the V-phase square wave signal outputted by the waveform rectifier circuit 303, a rotational speed computing data measurement process is performed in which the time from the previous inputting to the current input of a V-phase square wave signal is converted to a time equivalent to one rotation of the crankshaft of the engine, and this time equivalent to one rotation is stored in memory as V-phase rotational speed computing data. Every time a rising is perceived in the W-phase square wave signal, a rotational speed computing data measurement process is performed in which the time from the previous inputting to the current inputting of a W-phase square wave signal is converted to a time equivalent to one rotation of the crankshaft of the engine, and this time equivalent to one rotation is stored in memory as W-phase rotational speed computing data.

In step S106 of the main routine shown in FIG. 14, an instantaneous value of the rotational speed of the AC generator (the engine) is computed from the rotational speed computing data of each of the phases U through W found through the rotational speed computing data measurement process of FIG. 16. The rotational speed detecting means 3A is configured by the rotational speed computing data measurement process of FIG. 16 and the rotational speed computation procedure performed in step S106 of the main routine shown in FIG. 14.

The process shown in FIG. 17 is an operating state determination process for determining the engine operating state and switching the set value of the output voltage on the basis of the determination results, and is executed every time the rotational speed detection process of step S106 of FIG. 14 ends. In this process, either the rotational speed of the AC generator computed based on the rotational speed computing data of any of the three U, V, or W phases, or the average rotational speed of the AC generator computed based on the rotational speed computing data of the three phases, is used as determination speed data. The engine operating state is determined to be a decelerating state when the rotational speed of the AC generator is decreasing at a rate equal to or greater than the set rate of change, and the set value of the output voltage is switched to a value greater than the normal value when the engine operating state is determined to be in a decelerating state. The engine operating state is determined to be an accelerating state when the rotational speed of the AC generator is increasing at a rate equal to or greater than the set rate of change, and the set value of the output voltage is switched to a value smaller than the normal value when the engine operating state is determined to be in an accelerating state.

In the process of FIG. 17, first, in step S401, the difference between the previously calculated rotational speed and the currently calculated rotational speed is computed as the rotational speed rate of change $\Delta RPM$ (the amount of change in the rotational speed per unit time from the timing of the previous execution of the process of FIG. 17 until the timing of the current execution). A determination (an acceleration determination) is made in step S402 as to whether or not the rotational speed rate of change $\Delta RPM$ is equal to or greater than the set rate of change. As a result, when the rate of change $\Delta RPM$ is determined to not be equal to or greater than the set rate of change, the sequence advances to step S403 and a determination (a deceleration determination) is made as to whether or not the rate of change $\Delta RPM$ is equal to or less than the set rate of change. When it is determined in step S403 that the rate of change $\Delta RPM$ is not equal to or less than the set rate of change, the sequence advances to step S404, the engine operating state is determined to be the normal operating state, and the set value of the output voltage is set as the normal set value, ending this process.

When it is determined in step S403 that the rate of change $\Delta RPM$ is equal to or less than the set rate of change, the sequence advances to step S405, the engine operating state is deemed to be a decelerating state, and the set value of the output voltage is set to a deceleration set value greater than the normal set value, ending this process.

When it is determined in step S402 that the rate of change $\Delta RPM$ is equal to or greater than the set rate of change, the sequence advances to step S406, the engine operating state is deemed to be an accelerating state, and the set value of the output voltage is set to an acceleration set value less than the normal set value, ending this process.

The operating state determination means 3E is configured by steps S401 through S403 of FIG. 17, and the output voltage set value switching means 3F is configured by steps S404 through S406.

The output control process of FIG. 18 is performed after the operating state determination process of the main routine of FIG. 14 is performed. In the output control process of FIG. 18, first a determination is made in step S501 as to whether or not the currently set rectification mode is the three-phase rectification mode. As a result, when the mode is determined to not be the three-phase rectification mode, the sequence advances to step S502, and the rotational speed of the AC generator is compared with the set speed. A rectification mode determination procedure for bringing the rectification mode to the three-phase rectification mode is performed when the rotational speed is equal to or less than the set speed. As a result, when the rotational speed is determined to be equal to or less than the set speed, the rectification mode is set to the three-phase rectification mode in step S503. When the rotational speed is determined to exceed the set speed in step S502, the sequence transitions to step S506 described hereinafter.

When it is determined in step S501 that the set rectification mode is the three-phase rectification mode, the sequence advances to step S504, the rotational speed is compared with the set speed, and when the rotational speed exceeds the set speed, the rectification mode determination procedure is performed for bringing the rectification mode to the single-phase neutral point rectification mode. As a result of this determination, when the rotational speed is determined to exceed the set speed, the rectification mode is set to the single-phase neutral point rectification mode in step S505 and the sequence transitions to step S506.

In step S506, a determination is made as to whether or not the output voltage has been determined to be in an overvoltage state (a state exceeding 18 [V] in the present embodiment) in the determination process of FIG. 15. When the output voltage is not determined to be in an overvoltage state, the sequence advances to step S507 and a determination is made as to whether or not the output voltage exceeds the set value. As a result, when the output voltage is determined to be equal to or less than the set value, the sequence advances to step S508, and a determination is made as to whether or not the rectification mode has been set to the three-phase rectification mode.

When it is determined in step S508 that the rectification mode has been set to the three-phase rectification mode, the sequence advances to step S509 and a process is performed for stopping the trigger of the neutral point thyristor Sn. A process is also performed for simultaneously sending trigger signals to the upper thyristors and lower thyristors of all three phases UVW, and charging is thus performed in the three-phase rectification mode.

When it is determined in step S508 that the rectification mode has not been set to the three-phase rectification mode, the sequence advances to step S510. In step S510, the following processes are performed: a trigger signal is sent to the neutral point thyristor Sn to turn the thyristor Sn on; the upper and lower thyristors of one phase from among the upper and lower thyristors of all three phases are turned off and the energization through the magneto coil of this one phase is ceased; and trigger signals are sent simultaneously to the upper and lower thyristors of the other two phases to turn these thyristors on. Charging in the single-phase neutral point rectification mode is performed, wherein a charging current is supplied from the magneto coils of the two phases to the battery through the control rectifier circuit, and a charging current is supplied from the neutral point of the AC generator to the battery through the control rectifier circuit. In this case, the phase not being energized is switched at certain time intervals by the single-phase neutral point rectification mode phase-switching process shown in FIG. 19.

When the output voltage is determined in step S506 to be in an overvoltage state and the output voltage is determined in step S507 to exceed the set value, the sequence advances to step S511, a process is performed for stopping the trigger of the neutral point thyristor to turn the neutral point thyristor off. Additionally, a process is performed for stopping the triggers of the upper thyristors and lower thyristors of the three phases UVW to turn off the upper and lower thyristors of all phases. The output of all phases is thereby stopped, and the supply of charging current from the AC generator to the battery is stopped.

The overvoltage protection means 3D is configured by step S506 and step S511 of the output control process of FIG. 18, and the controller 3B is configured by the process of FIG. 18 excluding step S506.

Figure 19:
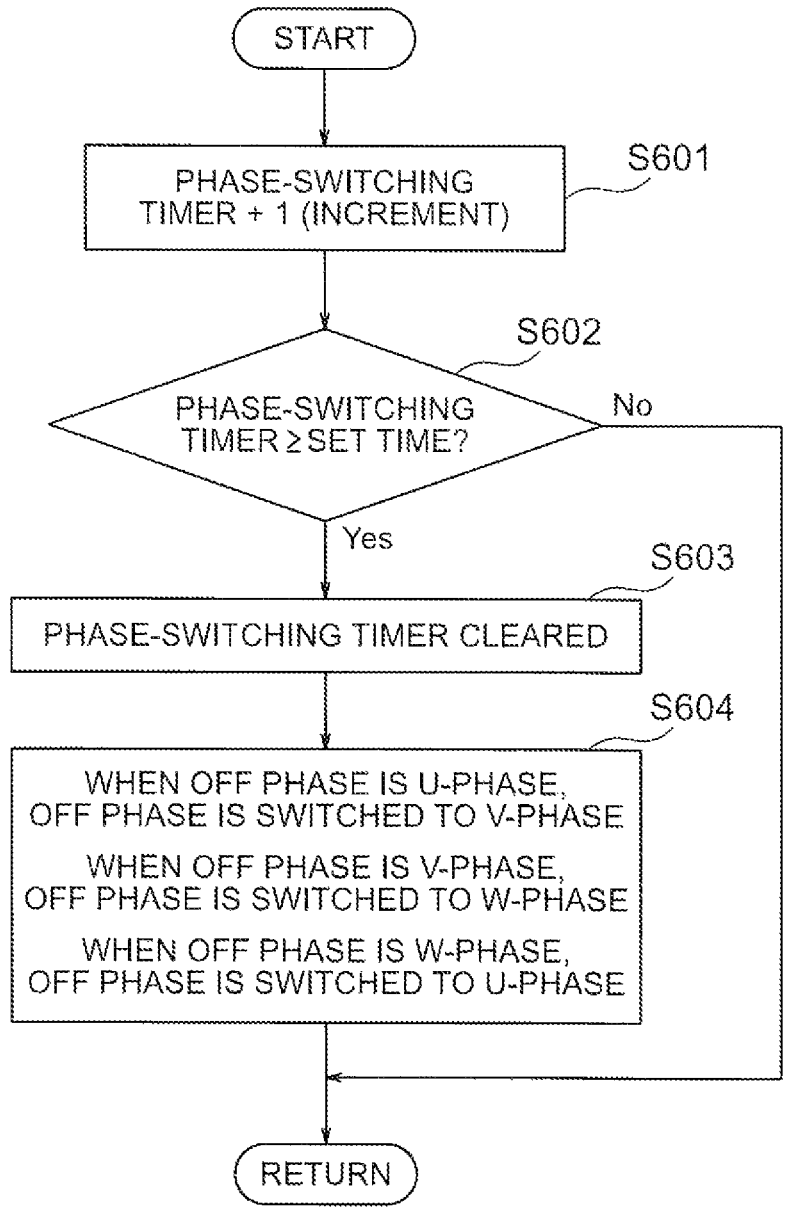
FIG. 19 is a flowchart showing an example of an algorithm of the single-phase neutral point rectification mode phase-switching process executed during the single-phase neutral point rectification mode in an embodiment of the present invention.
Figure 20:
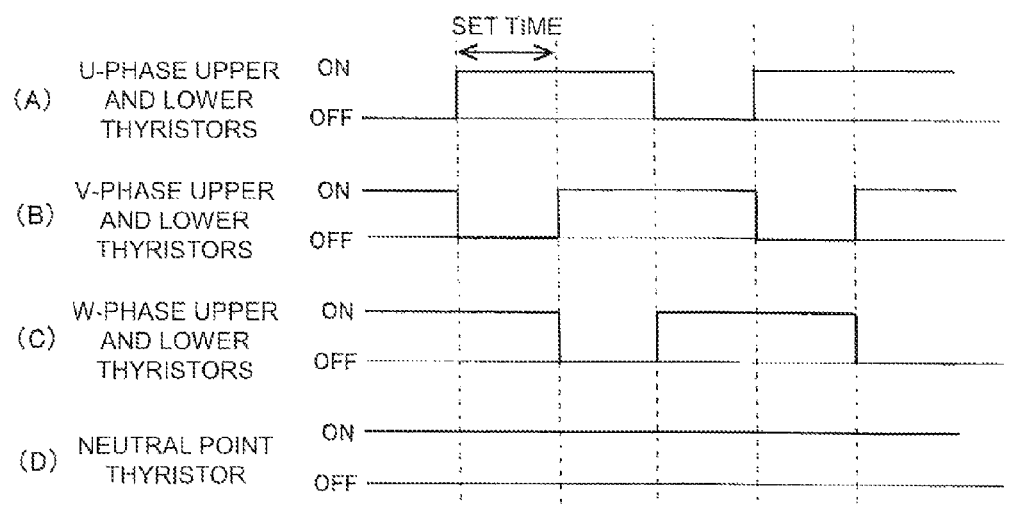
FIGS. 20(A) through (D) are timing charts showing the on-off action of the thyristors of the control rectifier circuit during the single-phase neutral point rectification mode.

In the single-phase neutral point rectification mode phase-switching process shown in FIG. 19, a phase-switching timer is incremented in step S601, and a determination is made in step S602 as to whether or not the time measured by the phase-switching timer is equal to or greater than a set time. As a result, when the time measured by the phase-switching timer is determined to not be equal to or greater than the set time, this process is ended without any further action. When the time measured by the phase-switching timer is determined in step S602 to be equal to or greater than the set time, the phase-switching timer is cleared in step S603, after which the sequence advances to step S604 and a process is performed for switching the phase not being energized. In the process of step S604, when the phase not being energized (expressed as the OFF phase in the chart) is the U-phase, the phase not being energized is switched to the V-phase. When the phase not being energized is the V-phase, the phase not being energized is switched to the W-phase. When the phase not being energized is the W-phase, the phase not being energized is switched to the U-phase. FIGS. 20(A) through (D) show timing charts showing the on-off action of the U-phase upper and lower thyristors, the V-phase upper and lower thyristors, the W-phase upper and lower thyristors, and the neutral point thyristor during the single-phase neutral point rectification mode.

Figure 3:
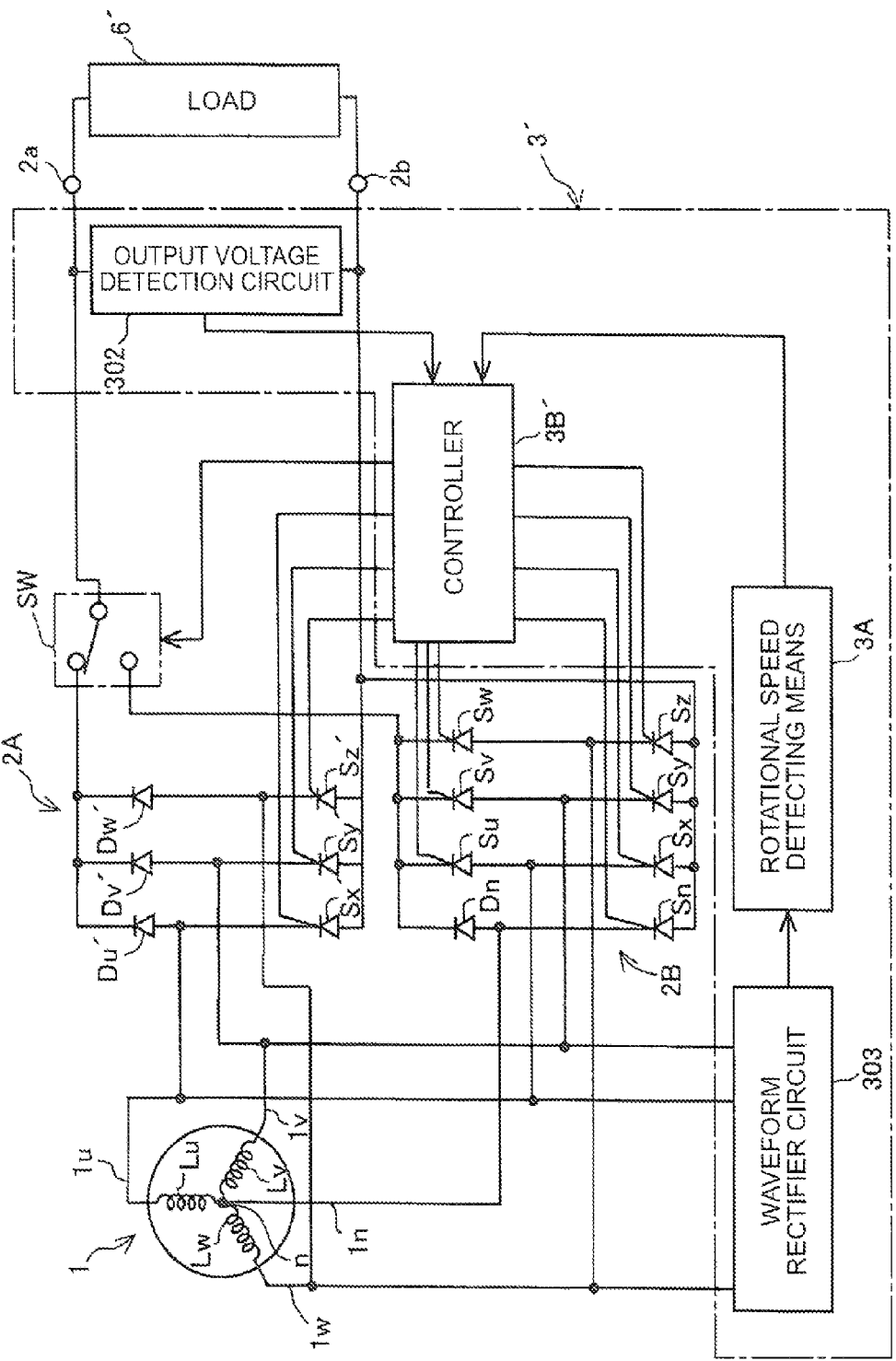
FIG. 3 is a circuit diagram showing the configuration of another embodiment of the present invention.

In the embodiment described above, the use of one control rectifier circuit was divided between a first control rectifier circuit and a second control rectifier circuit. The first control rectifier circuit performs full-wave rectification on the AC voltages of the three phases obtained from the three-phase AC output terminals of the AC generator. The second control rectifier circuit performs full-wave rectification on the AC voltages obtained between the neutral point terminal and each of two-phase AC output terminals selected from the three-phase AC output terminals of the AC generator. The second control rectifier circuit also performs full-wave rectification on the AC voltage obtained between the selected two-phase AC output terminals. As shown in FIG. 3, however, a circuit is also possible in which the first control rectifier circuit and the second control rectifier circuit are independent of each other.

In the example shown in FIG. 3, a first control rectifier circuit 2A is configured by upper diodes Du' through Dw' of the phases U through W and lower thyristors Sx' through Sz' of the phases U through W. A second control rectifier circuit 2B is configured by a neutral point diode Dn, upper thyristors Su through Sw of the phases U through W, a neutral point thyristor Sn, and lower thyristors Sx through Sw of the phases U through W. An output selection switch SW is provided for selecting the output of the first control rectifier circuit 2A and sending this output to the load 6' when the rotational speed of the AC generator detected by the rotational speed detecting means 3A is equal to or less than the set speed. The output selection switch SW also selects the output of the second control rectifier circuit 2B and sends this output to the load 6' when the detected rotational speed exceeds the set speed. The output selection switch SW is configured using a semiconductor switching element that can be controlled to turn on and off. Similar to the previous embodiment, the three-phase AC output voltages of the AC generator 1 are converted to square wave signals by the waveform rectifier circuit 303, and the rotational speed detecting means 3A detects the rotational speed of the AC generator from the square wave signals obtained from the waveform rectifier circuit 303. The load 6' includes a battery and a load connected to both ends of the battery.

In the example shown in FIG. 3, a controller 3B' is provided in order to control the first control rectifier circuit 2A, the second control rectifier circuit 2B, and the output selection switch SW. When the rotational speed detected by the rotational speed detecting means 3A is equal to or less than the set speed, the controller 3B' controls the output selection switch SW so as to select the output of the first control rectifier circuit 2A and supply this output to the load 6', and supplies trigger signals to the three-phase lower thyristors Sx' to Sz' of the first control rectifier circuit 2A to supply power from the first control rectifier circuit 2A to the load 6', so that the output voltage detected by the output voltage detection circuit 302 is kept equal to or less than the set value.

When the rotational speed detected by the rotational speed detecting means 3A exceeds the set speed, the controller 3B' controls the output selection switch SW so as to select the output of the second control rectifier circuit 2B and supply this output to the load 6'. The controller 3B' also supplies trigger signals to the upper thyristors and lower thyristors of the other two phases to supply power from the second control rectifier circuit 2B to the load 6' in a state in which the neutral point thyristor Sn constantly being triggered and the triggers having stopped on the upper thyristors and lower thyristors of one phase from among the three-phase upper thyristors Su through Sw and three-phase lower thyristors Sx through Sz. As a result, the output voltage detected by the output voltage detection circuit 302 is kept equal to or less than the set value. In this case as well, it is preferable that the phase in which the triggers of the upper thyristors and lower thyristors are stopped be switched at certain time intervals.

The rotational speed detecting means 3A and the controller 3B' are configured by a microprocessor in the embodiment shown in FIG. 3 as well. Though not shown in FIG. 3, in the present embodiment, a control power source circuit is provided which is similar to the control power source circuit 301 shown in FIG. 1, and power source voltage is supplied from this control power source circuit to the microprocessor constituting the rotational speed detecting means 3A and the controller 3B'. In the example shown in FIG. 3, a control unit 3' for controlling the first and second control rectifier circuits 2A and 2B and the output selection switch SW is configured by the control power source circuit (not shown), the output voltage detection circuit 302, the waveform rectifier circuit 303, and the microprocessor constituting the rotational speed detecting means 3A and controller 3B'.

As in the embodiment described above, when the first control rectifier circuit for supplying power to the load when the rotational speed is equal to or less than the set speed and the second control rectifier circuit for supplying power to the load when the rotational speed exceeds the set speed are provided separately. The load acting on the semiconductor element constituting the control rectifier circuit can be reduced, and temperature increases in the semiconductor element can therefore be suppressed.

In the example shown in FIG. 3, the output selection switch SW can be omitted, the cathode-side DC output terminal of the first control rectifier circuit 2A and the cathode-side DC output terminal of the second control rectifier circuit can be directly linked, and the diodes Du' through Dw' of the first control rectifier circuit can be replaced with three-phase upper thyristors. In this case, the three-phase upper thyristors and lower thyristors of the first control rectifier circuit are triggered to supply power to the load when the rotational speed of the AC generator is equal to or less than the set speed, and when the rotational speed of the AC generator exceeds the set speed, the second control rectifier circuit 2B is controlled in the previously explained manner, supplying power from the second control rectifier circuit 2B to the load in a state in which the three-phase upper thyristors and three-phase lower thyristors of the first control rectifier circuit are all kept off.

When the first control rectifier circuit and the second control rectifier circuit are provided separately and when the phase whose magneto coil is cut off from the load is fixed in the second control rectifier circuit 2B, the upper thyristor and lower thyristor of the phase whose magneto coil is cut off from the load can be omitted. In FIG. 3, for example, the thyristors Sw and Sz can be omitted in cases in which the W-phase magneto coil is never used to drive the load in a range in which the rotational speed exceeds the set speed. In this case, the terminal of a non-neutral point of the W-phase magneto coil not used to drive the load is not connected to the second control rectifier circuit 2B.

In the embodiments described above, a diode Dn was used as the element connecting the neutral point terminal 1n of the AC generator to the cathode-side DC output terminal 2a, but the element connecting the neutral point terminal 1n of the AC generator to the cathode-side DC output terminal 2a is preferably an energizing element which is provided between the neutral point connecting terminal 1a and the cathode-side DC output terminal 2a and which is conductive when the electric potential of the neutral point connecting terminal 1a is higher than the electric potential of the cathode-side DC output terminal 2a. In the embodiments described above, for example, it may be an energizing element in which the diode Dn is replaced with a thyristor or another switching element that is turned on when power is supplied to the load from the neutral point n side of the AC generator 1. This switching element is provided between the neutral point terminal and the cathode-side DC output terminal.

Embodiments of the present invention were described above, and the following is an enumeration of the invention disclosed in the present specification and drawings.

(1) First Invention

The first invention disclosed herein relates to a power source device for supplying power to a load, an AC generator driven by an engine being a power source, wherein three-phase AC output terminals are leading from respective non-neutral point terminals of three-phase magneto coils in a star-shaped connection, and a neutral point terminal is leading from a neutral point. The present invention comprises: rotational speed detecting means for detecting the rotational speed of the AC generator from the output of the AC generator; a first control rectifier circuit for performing full-wave rectification on three-phase AC voltages obtained from three-phase AC output terminals of the AC generator; a second control rectifier circuit for performing full-wave rectification on AC voltages obtained between the neutral point terminal and each of two-phase AC output terminals selected from the three-phase AC output terminals of the AC generator, as well as on AC voltage obtained between the selected two-phase AC output terminals; and a controller for controlling the first control rectifier circuit and the second control rectifier circuit so that the output of the first control rectifier circuit is supplied to the load when the rotational speed detected by the rotational speed detecting means is equal to or less than a set speed, and the output of the second control rectifier circuit is supplied to the load when the detected rotational speed exceeds the set speed.

With the configuration described above, in a low-speed range in which the rotational speed of the AC generator is equal to or less than the set speed, power is supplied from the three-phase magneto coils of the AC generator to the load through the first control rectifier circuit, and sufficient power can therefore be supplied to the load in the low-speed range by setting the winding design of the three-phase magneto coils so as to generate sufficient output in the low-speed rotation range.

In a range in which the rotational speed of the AC generator exceeds the set speed, power is supplied to the load from the second control rectifier circuit which performs full-wave rectification on AC voltages obtained between the neutral point terminal and each of two-phase AC output terminals selected from the three-phase AC output terminals of the AC generator, as well as on AC voltage obtained between the selected two-phase AC output terminals. In this state, the one unselected AC output terminal is cut off from the load. Thus, when a magneto coil of one phase is cut off from the load and current is supplied to the load from only a magneto coil of two phases in a range in which the rotational speed exceeds the set speed, the total number of turns of the magneto coils supplying a load current can be reduced to reduce the armature reaction, and decreases in the output of the AC generator in the high-speed rotation range caused by the armature reaction can be suppressed.

In a range in which the rotational speed of the AC generator exceeds the set speed, because the load of the AC generator is asymmetrical, the electric potential of the neutral point can be increased to cause a current to flow to the load from the neutral point as well, increasing the power that can be supplied to the load. Specifically, the electric potential of the neutral point of the AC generator increases for a duration which starts with the timing at which the absolute value of the induced voltage of a negative half-wave of one of the selected magneto coils of two phases (a half-wave in which the neutral point has positive polarity) exceeds the absolute value of the induced voltage of the positive half-wave of the other magneto coil. The duration ends with the timing at which the absolute value of the induced voltage of a positive half-wave of one of the selected magneto coils of two phases exceeds the absolute value of the induced voltage of the negative half-wave of the other magneto coil (a duration equivalent to the positive half-wave of the induced voltage of the magneto coil of the unselected phase cut off from the load). During this duration, current is supplied to the load through the second control rectifier circuit from the neutral point terminal of the AC generator as well.

Thus, in the first invention, in a range in which the rotational speed of the AC generator exceeds the set speed, the armature reaction of the AC generator can be reduced to suppress decreases in the power generation output caused by the armature reaction by cutting off a magneto coil of one phase from a load to create a non-load state, and the power that can be supplied to the load in the high-speed rotation range can be increased because the electric potential of the neutral point can be increased to supply current to the load through the control rectifier circuit from the neutral point as well.

(2) Second Invention

In the second invention disclosed herein, the controller is configured so as to switch the selected two-phase AC output terminals at certain time intervals when the detected rotational speed exceeds the set speed.

As in the first invention, when a magneto coil of one phase is put into a non-load state creating an unbalanced operating state in a range in which the rotational speed exceeds the set speed, the current flowing to the other two magneto coils is nonuniform. Therefore, when the selected phase is fixed in a range in which the rotational speed exceeds the set speed, a large current flows to the magneto coil of the specified phase, and there is a risk of the temperature increasing excessively. When the controller is configured so as to switch the selected two-phase AC output terminals at certain time intervals when the detected rotational speed exceeds the set speed, the temperature of the magneto coil of the specified phase can be prevented from increasing excessively in a range in which the rotational speed exceeds the set speed.

(3) Third Invention

In the third invention, the control rectifier circuit has a configuration comprising three-phase AC input terminals connected respectively to three-phase AC output terminals of the AC generator, a neutral point connection terminal connected to the neutral point terminal of the AC generator, a cathode-side DC output terminal and anode-side DC output terminal connected respectively to one end and another end of the load, three-phase upper thyristors and lower thyristors constituting top and bottom sections of a bridge circuit of a full-bridge three-phase full-wave control rectifier circuit for performing full-wave rectification on three-phase AC output of the AC generator inputted through the three-phase AC input terminals and outputting from the DC output terminals, a neutral point upper energizing element which is provided between the neutral point connection terminal and the cathode-side DC output terminal and is conductive when the electric potential of the neutral point connection terminal is higher than the electric potential of the cathode-side DC output terminal, and a neutral point thyristor having a cathode connected to the neutral point connection terminal and an anode connected to the anode-side DC output terminal.

In this case, provided are rotational speed detecting means for detecting the rotational speed of the AC generator from the output of the AC generator; and a controller for supplying trigger signals to the three-phase upper thyristors and lower thyristors in order to supply power from the control rectifier circuit to the load in a state in which the trigger of the neutral point thyristor is stopped, when the rotational speed detected by the rotational speed detecting means is equal to or less than the set speed; and supplying trigger signals to the upper thyristors and lower thyristors of the other two phases in order to supply power from the control rectifier circuit to the load in a state in which the neutral point thyristor is constantly being triggered and the triggers of the upper thyristor and lower thyristor of one of the three phases is stopped, when the rotational speed detected by the rotational speed detecting means exceeds the set speed.

With the configuration described above, the circuit configuration can be prevented from becoming complicated because the control rectifier circuit functions as the first control rectifier circuit when the rotational speed of the AC generator is equal to or less than the set speed, and the control rectifier circuit functions as the second control rectifier circuit when the rotational speed of the AC generator exceeds the set speed.

The first control rectifier circuit and the second control rectifier circuit may be circuits independent of each other, but in order to simplify the configuration, it is preferable that the use of one control rectifier circuit be divided between a first control rectifier circuit and a second control rectifier circuit as described above.

(4) Fourth Invention

In the fourth invention disclosed herein, when the control rectifier circuit is configured as in the third invention described above, the controller is configured so as to switch one of the phases of the AC output terminal of the upper thyristor and lower thyristor at certain time intervals when the rotational speed detected by the rotational speed detecting means exceeds the set speed.

With such a configuration, it is possible to prevent a large current from flowing to the magneto coil of the specified phase and the temperature from increasing excessively.

(5) Fifth Invention

The fifth invention disclosed herein is provided with: (a) a control power source circuit having an input capacitor to which the output voltage is applied through a reverse-current protection diode having an anode directed toward the cathode-side DC output terminal, and a regulator for converting the voltage of both ends of the input capacitor to a certain control power source voltage and applying this voltage to both ends of an output capacitor; (b) a waveform rectifier circuit for rectifying the waveform of the three-phase AC outputs of the AC generator to square wave signals; (c) an output voltage detection circuit for detecting the output voltage of the control rectifier circuit from the voltage obtained by dividing the voltage of both ends of the input capacitor of the control power source circuit detected at the cathode side of the reverse-current protection diode; and (d) a microprocessor provided so as to run using, as a power source voltage, the control power source voltage obtained at both ends of the output capacitor of the control power source circuit as the power source voltage, and programmed so as to constitute the rotational speed detecting means and the controller. In this case, the rotational speed detecting means is configured so as to compute the rotational speed of the AC generator from the generation intervals of the square wave signals generated at electrical angles by the waveform rectifier circuit sequentially at angular intervals of 120°. The controller is configured so as to control the upper thyristors and lower thyristors of the control rectifier circuit in order to keep the output voltage detected by the output voltage detection circuit equal to or less than a set value.

Conventional power source devices installed in vehicles, outboard motors, and other vessels driven by an engine have not had internal means for detecting information regarding the rotational speed of the AC generator. Therefore, in cases where the power supplied to the load is controlled according to the rotational speed of the AC generator, the rotational speed information of the AC generator (the engine) must be acquired from an electric engine control unit (ECU) for controlling the engine ignition timing and fuel injection rate in accordance with the engine speed, which has been problematic. In the fifth invention, because rotational speed detecting means is provided in the power source device and the rotational speed can be detected within the power source device, the power supplied to the load can be controlled according to the rotational speed of the AC generator without acquiring the rotational speed information from other units.

When the microprocessor is provided in the power source device as described above, the microprocessor is made to execute a predetermined program, whereby the controller can be made to have various control functions, making the power source device more intelligent, and the power source device can be made to have various functions, such as charging the battery while accounting for the operating state of the engine, such as acceleration or deceleration, without assistance from the ECU.

(6) Sixth Invention

In the sixth invention, the AC generator described above is a magnetic AC generator in which the magnetic field of the rotor is configured by a permanent magnet.

The phenomenon of the output voltage being suppressed by the armature reaction in a range of high rotational speed is prominent in the case of an AC generator with a constant magnetic field, such as a magnetic AC generator. Consequently, the present invention is useful particularly in cases in which a magnetic AC generator is used as an AC generator driven by an engine.

Preferred embodiments of the present invention were described above, but the present invention is not limited by these embodiments, and various modifications can of course be made to the components within a range that does not deviate from the accompanying patent claims.

What is claimed is:

1. A power source device for supplying power to a load, an AC generator driven by an engine being a power source, three-phase AC output terminals leading from respective non-neutral point terminals of three-phase magneto coils in a star-shaped connection, and a neutral point terminal leading from a neutral point; the power source device comprising:
   rotational speed detecting means for detecting the rotational speed of the AC generator from the output of the AC generator;
   a first control rectifier circuit for performing full-wave rectification on three-phase AC voltages obtained from three-phase AC output terminals of the AC generator;
   a second control rectifier circuit for performing full-wave rectification on AC voltages obtained between the neutral point terminal and each of two-phase AC output terminals selected from the three-phase AC output terminals of the AC generator, as well as on AC voltage obtained between the selected two-phase AC output terminals; and
   a controller for controlling the first control rectifier circuit and the second control rectifier circuit so that the output of the first control rectifier circuit is supplied to the load when the rotational speed detected by the rotational speed detecting means is equal to or less than a set speed, and the output of the second control rectifier circuit is supplied to the load when the detected rotational speed exceeds the set speed.

2. The power source device of claim 1, the controller being configured so as to switch the selected two-phase AC output terminals at certain time intervals when the detected rotational speed exceeds the set speed.

3. The power source device of claim 2, the AC generator comprising a magnetic AC generator in which the magnetic field of the rotor is configured by a permanent magnet.

4. The power source device of claim 1, the AC generator comprising a magnetic AC generator in which the magnetic field of the rotor is configured by a permanent magnet.

5. A power source device for supplying power to a load, an AC generator driven by an engine being a power source, three-phase AC output terminals leading from respective non-neutral point terminals of three-phase magneto coils in a star-shaped connection, and a neutral point terminal leading from a neutral point; the power source device comprising:
   a control rectifier circuit having three-phase AC input terminals connected respectively to three-phase AC output terminals of the AC generator, a neutral point connection terminal connected to the neutral point terminal of the AC generator, a cathode-side DC output terminal and anode-side DC output terminal connected respectively to one end and another end of the load, three-phase upper thyristors and lower thyristors constituting top and bottom sections of a bridge circuit of a full-bridge three-phase full-wave control rectifier circuit for performing full-wave rectification on three-phase AC output of the AC generator inputted through the three-phase AC input terminals and outputting from the DC output terminals, an energizing element which is provided between the neutral point connection terminal and the cathode-side DC output terminal and is conductive when the electric potential of the neutral point connection terminal is higher than the electric potential of the cathode-side DC output terminal, and a neutral point thyristor having a cathode connected to the neutral point connection terminal and an anode connected to the anode-side DC output terminal;
   rotational speed detecting means for detecting the rotational speed of the AC generator from the output of the AC generator; and
   a controller for supplying trigger signals to the three-phase upper thyristors and lower thyristors in order to supply power from the control rectifier circuit to the load in a state in which the trigger of the neutral point thyristor is stopped, when the rotational speed detected by the rotational speed detecting means is equal to or less than the set speed; and supplying trigger signals to the upper thyristors and lower thyristors of the other two phases in order to supply power from the control rectifier circuit to the load in a state in which the neutral point thyristor is constantly being triggered and the triggers of the upper thyristor and lower thyristor of one of the three phases is stopped, when the rotational speed detected by the rotational speed detecting means exceeds the set speed.

6. The power source device of claim 5, the controller being configured so as to switch the phase in which the triggers of the upper thyristor and lower thyristor are stopped at certain time intervals when the rotational speed detected by the rotational speed detecting means exceeds the set speed.

7. The power source device of claim 6, further comprising:
a control power source circuit having an input capacitor to which the output voltage is applied through a reverse-current protection diode having an anode directed toward the cathode-side DC output terminal, and a regulator for converting the voltage of both ends of the input capacitor to a certain control power source voltage and applying this voltage to both ends of an output capacitor;
a waveform rectifier circuit for rectifying the waveform of the three-phase AC outputs of the AC generator to square wave signals;
an output voltage detection circuit for detecting the output voltage of the control rectifier circuit from the voltage obtained by dividing the voltage of both ends of the input capacitor of the control power source circuit detected on the cathode side of the reverse-current protection diode; and
a microprocessor provided so as to run using, as a power source voltage, the control power source voltage obtained at both ends of the output capacitor of the control power source circuit, and programmed so as to constitute the rotational speed detecting means and the controller;
the rotational speed detecting means being configured so as to compute the rotational speed of the AC generator from the generation intervals of the square wave signals generated at electrical angles by the waveform rectifier circuit sequentially at angular intervals of 120'; and
the controller being configured so as to control the upper thyristors and lower thyristors of the control rectifier circuit in order to keep the output voltage detected by the output voltage detection circuit equal to or less than a set value.

8. The power source device of claim 7, the AC generator comprising a magnetic AC generator in which the magnetic field of the rotor is configured by a permanent magnet.

9. The power source device of claim 6, the AC generator comprising a magnetic AC generator in which the magnetic field of the rotor is configured by a permanent magnet.

10. The power source device of claim 5, further comprising:
a control power source circuit having an input capacitor to which the output voltage is applied through a reverse-current protection diode having an anode directed toward the cathode-side DC output terminal, and a regulator for converting the voltage of both ends of the input capacitor to a certain control power source voltage and applying this voltage to both ends of an output capacitor;
a waveform rectifier circuit for rectifying the waveform of the three-phase AC outputs of the AC generator to square wave signals;
an output voltage detection circuit for detecting the output voltage of the control rectifier circuit from the voltage obtained by dividing the voltage of both ends of the input capacitor of the control power source circuit detected at the cathode side of the reverse-current protection diode; and
a microprocessor provided so as to run using, as a power source voltage, the control power source voltage obtained at both ends of the output capacitor of the control power source circuit, and programmed so as to constitute the rotational speed detecting means and the controller;
the rotational speed detecting means being configured so as to compute the rotational speed of the AC generator from the generation intervals of the square wave signals generated at electrical angles by the waveform rectifier circuit sequentially at angular intervals of 120'; and
the controller being configured so as to control the upper thyristors and lower thyristors of the control rectifier circuit in order to keep the output voltage detected by the output voltage detection circuit equal to or less than a set value.

11. The power source device of claim 5, the AC generator comprising a magnetic AC generator in which the magnetic field of the rotor is configured by a permanent magnet.

12. The power source device of claim 5, the AC generator comprising a magnetic AC generator in which the magnetic field of the rotor is configured by a permanent magnet.

* * * * *

UNITED STATES PATENT AND TRADEMARK OFFICE
CERTIFICATE OF CORRECTION

| | | |
|---|---|---|
| PATENT NO. | : 8,736,233 B2 | |
| APPLICATION NO. | : 13/593873 | |
| DATED | : May 27, 2014 | |
| INVENTOR(S) | : Muramatsu et al. | |

It is certified that error appears in the above-identified patent and that said Letters Patent is hereby corrected as shown below:

IN THE SPECIFICATION:

Column 10, line 53, please delete "in" and insert --1n--

IN THE CLAIMS:

Column 27, line 44, please delete "120'" and insert --120°--

Column 28, line 37, please delete "120'" and insert --120°--

Column 28, line 43, please delete "claim 5'" and insert --claim 10--

Signed and Sealed this
Thirteenth Day of January, 2015

Michelle K. Lee
*Deputy Director of the United States Patent and Trademark Office*